(12) United States Patent
Lee et al.

(10) Patent No.: US 12,538,097 B2
(45) Date of Patent: Jan. 27, 2026

(54) METHOD FOR PROVIDING LOCATION CONFIRMATION SERVICE FOR ELECTRONIC DEVICE, AND DEVICE THEREFOR

(71) Applicant: SAMSUNG ELECTRONICS CO., LTD., Suwon-si (KR)

(72) Inventors: Lyesuk Lee, Suwon-si (KR); Junghoon Lee, Suwon-si (KR); Hyosung Jung, Suwon-si (KR); Gajin Song, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 340 days.

(21) Appl. No.: 18/105,415

(22) Filed: Feb. 3, 2023

(65) Prior Publication Data

US 2023/0188942 A1 Jun. 15, 2023

Related U.S. Application Data

(63) Continuation of application No. PCT/KR2021/009669, filed on Jul. 26, 2021.

(30) Foreign Application Priority Data

Aug. 4, 2020 (KR) .................. 10-2020-0097670

(51) Int. Cl.
*H04W 8/00* (2009.01)
*H04W 4/029* (2018.01)
(Continued)

(52) U.S. Cl.
CPC ............. *H04W 4/029* (2018.02); *H04W 4/80* (2018.02); *H04W 8/005* (2013.01); *H04W 8/22* (2013.01)

(58) Field of Classification Search
CPC ....... H04W 4/029; H04W 4/80; H04W 8/005; H04W 8/22; H04W 8/00
See application file for complete search history.

(56) References Cited

U.S. PATENT DOCUMENTS 9,020,526 B1   4/2015  Cullen
2009/0040041 A1  2/2009  Janetis et al.
(Continued)

FOREIGN PATENT DOCUMENTS

CN   101828413   9/2010
CN   105163266   12/2015
(Continued)

OTHER PUBLICATIONS

International Search Report for PCT/KR2021/009669, mailed Nov. 10, 2021, 6 pages.
(Continued)

*Primary Examiner* — Tuan H Nguyen
(74) *Attorney, Agent, or Firm* — Nixon & Vanderhye, P.C.

(57) ABSTRACT

An example electronic device may include a location measurement circuit; a first wireless communication circuit; a second wireless communication circuit; and at least one processor. The at least one processor may: receive a first advertising packet including identification information of a first external device and a multi-hop count; obtain location information of the electronic device when the multi-hop count is a first value; transmit a signal including the identification information and the location information to a server; and broadcast a second advertising packet including the identification information of the first external device and a multi-hop count having a second value increased from the first value.

15 Claims, 15 Drawing Sheets

(51) Int. Cl.
*H04W 4/80* (2018.01)
*H04W 8/22* (2009.01)

(56) References Cited

U.S. PATENT DOCUMENTS

| | | |
|---|---|---|
| 2009/0093233 A1 | 4/2009 | Chitlur |
| 2009/0153402 A1 | 6/2009 | Doh et al. |
| 2014/0247821 A1 | 9/2014 | Yamada et al. |
| 2015/0081840 A1 | 3/2015 | Patil et al. |
| 2017/0041868 A1* | 2/2017 | Palin ................. H04W 52/0216 |
| 2017/0070847 A1 | 3/2017 | Altman et al. |
| 2017/0078837 A1 | 3/2017 | Liang et al. |
| 2017/0280377 A1 | 9/2017 | Patil et al. |
| 2018/0054698 A1 | 2/2018 | Park et al. |
| 2019/0253829 A1 | 8/2019 | Lévêque |

FOREIGN PATENT DOCUMENTS

| | | |
|---|---|---|
| CN | 106535105 | 3/2017 |
| CN | 108781357 | 11/2018 |
| CN | 109474913 | 3/2019 |
| CN | 110415495 | 11/2019 |
| JP | 2006-270629 | 10/2006 |
| JP | 2011-170769 | 9/2011 |
| JP | 2017-108257 | 6/2017 |
| KR | 10-0943830 | 2/2010 |
| KR | 10-2013-0017990 | 2/2013 |
| KR | 10-2014-0146080 | 12/2014 |
| KR | 101574767 | 12/2015 |
| KR | 10-2016-0047181 | 5/2016 |
| KR | 10-2016-0057413 | 5/2016 |
| KR | 10-2016-0097998 | 8/2016 |
| KR | 10-2019-0076175 | 7/2019 |
| WO | 2014/087196 | 6/2014 |
| WO | 2016/144085 | 9/2016 |

OTHER PUBLICATIONS

Written Opinion of the ISA for PCT/KR2021/009669, mailed Nov. 10, 2021, 5 pages.
Extended Search Report dated Dec. 19, 2023 in European Patent Application No. 21854309.8.
Office Action dated Apr. 1, 2025 in Korean Application No. 10-2020-0097670 and English-language translation.
Notice of Patent Grant dated Jul. 1, 2025 in Korean Patent Application No. 10-2020-0097670 and English-language translation.
Office Action dated Sep. 3, 2025 in Chinese Application No. 202180057330.2 and English-language translation.

* cited by examiner

METHOD FOR PROVIDING LOCATION CONFIRMATION SERVICE FOR ELECTRONIC DEVICE, AND DEVICE THEREFOR

CROSS-REFERENCE TO RELATED APPLICATIONS

This application is a continuation of International Application No. PCT/KR2021/009669 designating the United States, filed on Jul. 26, 2021, in the Korean Intellectual Property Receiving Office and claiming priority to Korean Patent Application No. 10-2020-0097670, filed on Aug. 4, 2020, in the Korean Intellectual Property Office, the disclosures of which are incorporated by reference herein in their entireties.

BACKGROUND

Field

The disclosure relates to a technique for providing a location identification service for an electronic device.

Description of Related Art

Recently, as various electronic products have been increasingly supplied, users use a plurality of devices, such as a smartwatch, earphones, or a tablet PC, available to connect with a mobile communication device, such as a smartphone, in addition to the smartphone. A user may lose a device due, for example, to the small size of the device, such as earphones, or the user's negligence, for which the manufacturer of the device or a service provider may provide a service of identifying the location of the lost device. For example, a server may collect the location of a user's lost smartphone, and may provide the location of the smartphone for the user. For example, when a user who has lost a smartphone logs in to the smartphone manufacturer's website with the user's own account and makes a request to identify the location of the smartphone, the server may provide identified location information through the website or an application via communication with the smartphone.

The foregoing method is premised on a case in which an electronic device capable of direct communication with the server, such as the smartphone, has been lost, and thus may not be used for a device (e.g., earphones, earbuds, or a headset) that is capable of pairing with the smartphone via short-distance communication (e.g., Bluetooth™ or Wi-Fi Direct) but is unable to perform direct communication with the server. In this case, when the lost device broadcasts identification information about the lost device to an adjacent device, the adjacent device may provide information about the adjacent device and the identification information about the lost device together to the server, and the server may provide location information about the lost device for the user of the lost device using the identification information about the lost device.

SUMMARY

Generally, in a service for identifying a location of a lost device, an electronic device receiving a signal generated from the lost device needs to provide location information about a corresponding point to a predetermined server. Therefore, the server may be generally operated by a manufacturer of a terminal device, and a terminal manufactured by the manufacturer may be basically provided with this service.

For example, when most adjacent terminals report a signal generated from a lost device to a server, the server may be overloaded or may unnecessarily collect a large amount of data, and the terminals may also need to use resources thereof (e.g., a GPS and a communication module) for location measurement and communication with the server, thus wasting resources. For example, when a smartwatch is lost in a large building where a large number of offices are concentrated, there are thousands to tens of thousands of smartphones capable of receiving a signal generated from the smartwatch, in which case, if all the smartphones transmit location information to a server, loss of radio resources is unnecessarily incurred.

Accordingly, various embodiments of the disclosure may enable a location identification service for a lost device even though, for example, a user loses the device in other countries.

Technical aspects to be achieved in example embodiments disclosed herein are not limited to the technical aspects mentioned above, and other technical aspects not mentioned will be clearly understood by those skilled in the art from the following description.

According to various example embodiments of the disclosure, an electronic device may include a location measurement circuit, a first wireless communication circuit configured to support short-range communication, a second wireless communication circuit, and at least one processor configured to be electrically connected to the location measurement circuit, the first wireless communication circuit, and the second wireless communication circuit, wherein the at least one processor may be configured to receive a first advertising packet including identification information about a first external device and a multi-hop count from the first external device using the first wireless communication circuit, obtain location information about the electronic device using the location measurement circuit when the multi-hop count included in the first advertising packet is a first value, transmit a signal including the identification information about the first external device and the location information to a server using the second wireless communication circuit, and broadcast a second advertising packet including the identification information about the first external device and a multi-hop count having a second value greater than the first value using the first wireless communication circuit.

According to various example embodiments of the disclosure, an operating method of an electronic device may include: receiving a first advertising packet from a first external device using a first wireless communication circuit of the electronic device, the first advertising packet including identification information about the first external device and a multi-hop count; obtaining location information about the electronic device using a location measurement circuit when the multi-hop count included in the first advertising packet is a first value, using at least one processor of the electronic device; transmitting a signal including the identification information about the first external device and the location information to a server using a second wireless communication circuit of the electronic device; and broadcasting a second advertising packet including the identification information about the first external device and a multi-hop count having a second value greater than the first value using the first wireless communication circuit.

According to various example embodiments of the disclosure, an electronic device may include a wireless communication circuit, a memory, and a processor configured to be electrically connected to the wireless communication circuit and the memory, wherein the processor may broadcast an advertising packet including identification information about the electronic device and a multi-hop count having a first value using the wireless communication circuit.

According to various example embodiments disclosed herein, an electronic device may determine whether to perform location measurement and to perform a report to a server according to a multi-hop count included in an obtained packet, thereby minimizing waste of resources that may occur in providing a service for identifying the location of a lost device.

In addition, various effects directly or indirectly identified through this disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In describing the drawings, the same or like reference numerals may be used to refer to the same or like elements.

DETAILED DESCRIPTION

Hereinafter, various embodiments of the disclosure will be described with reference to the accompanying drawings. However, these embodiments are not intended to limit the disclosure to specific embodiments and should be construed as including various modifications, equivalents, or alternatives of the embodiments of the disclosure.

Figure 1:
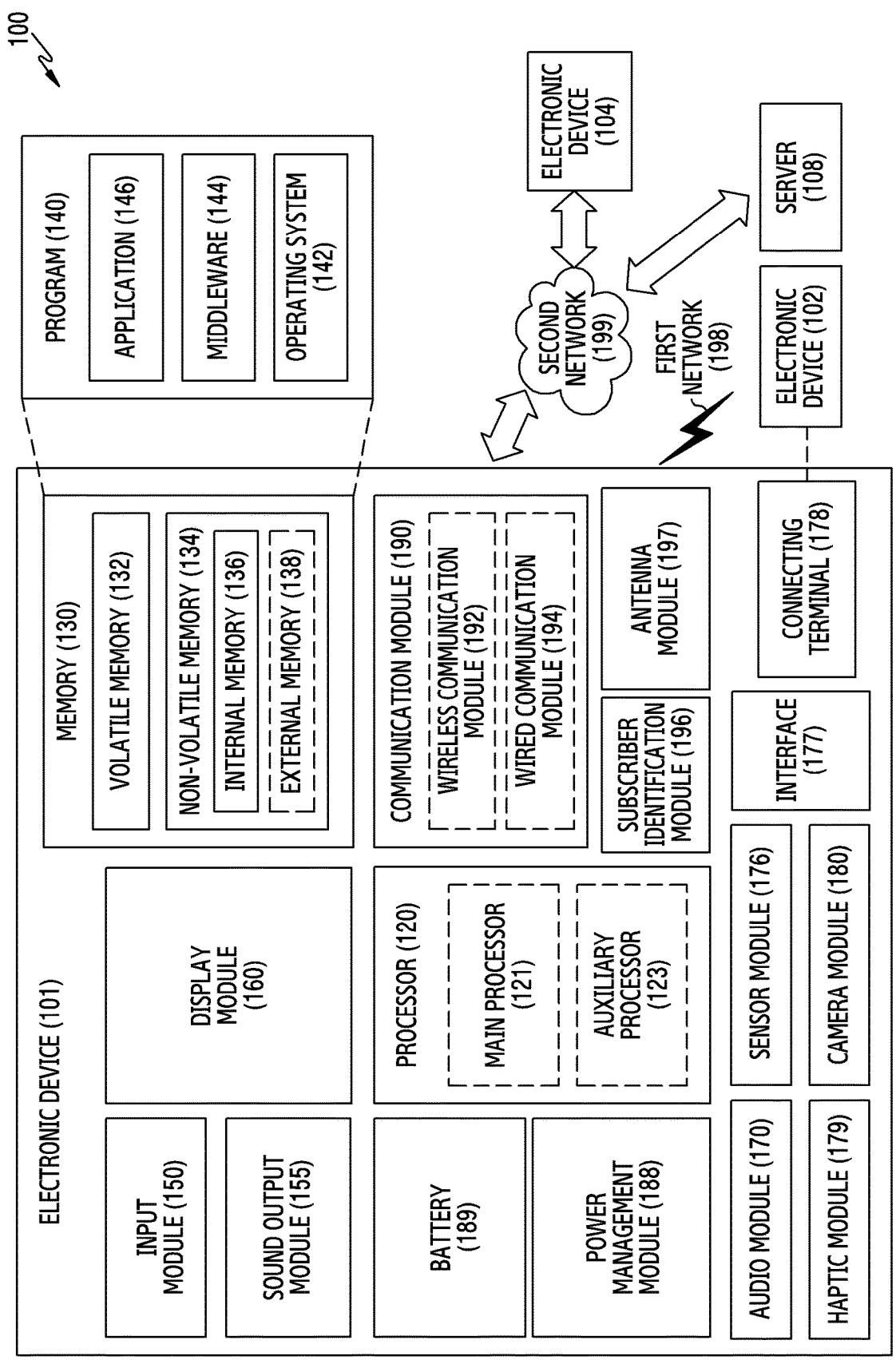
FIG. 1 is a block diagram of an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
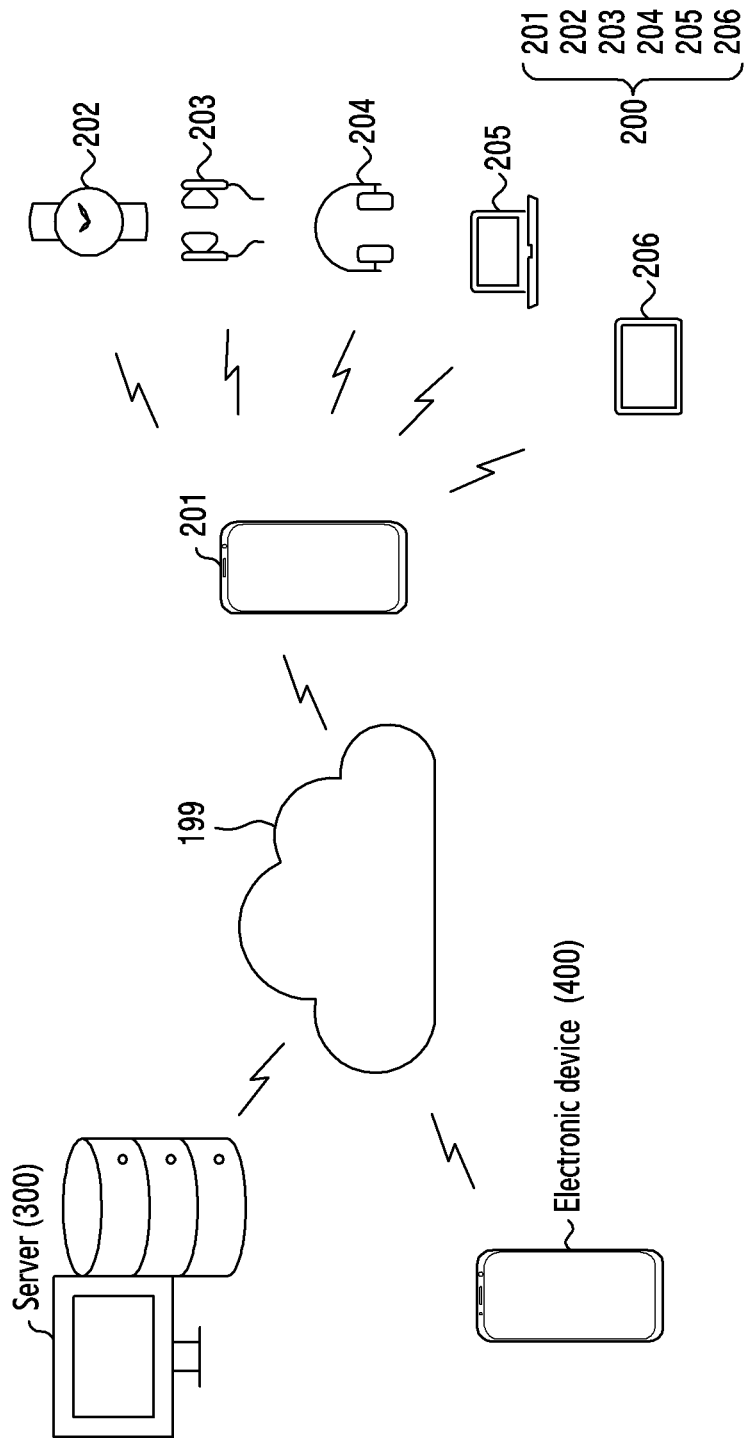
FIG. 2 is a diagram illustrating an example system for identifying the location of a user device according to various embodiments.

FIG. 2 is a diagram illustrating an example system for identifying the location of a user device according to various embodiments.

Referring to FIG. 2, an example system according to an embodiment may include user devices 200, a server 300, and an electronic device 400. At least one of the user devices 200 and the electronic device 400 may be connected to the server 300 through a second network 199 (e.g., a Wi-Fi or cellular network).

In an embodiment, the user devices 200 may include a plurality of devices. For example, a user may further possess at least one of a second device 202, a third device 203, a fourth device 204, a fifth device 205, and a sixth device 206 in addition to a first device 201 which is mainly used. The first device 201 may be, for example, a mobile communication device, such as a smartphone. The second device 202 may be, for example, a wearable device, such as a smartwatch. The third device 203 may be, for example, a Bluetooth earphone, such as an earbud. The fourth device 204 may be, for example, a Bluetooth headphone or headset. The fifth device 205 may be, for example, a laptop. The sixth device 206 may be, for example, a tablet PC. In addition to the examples shown in FIG. 2, the user may use another appropriate device(s) by interworking with the first device 201. For example, a key fob, a wallet, a backpack, a dog or cat identification device, a car, a bicycle, an identification card, a briefcase, an umbrella, and/or other gear may interwork with the first device as long a communication function described herein is satisfied, and may be subjected to location tracking by the first device 201 when lost. Further, in an embodiment, the user may use two or more identical devices. For example, the user may use a plurality of smartphones (e.g., the first device 201) by interworking with each other. In addition, the user may use two or more tablet PCs (e.g., the sixth device 206) by interworking with the first device 201.

In an embodiment, the user devices 200 may be connected to each other by using a predetermined communication protocol. For example, the first device 201 may be connected to at least one of the second device 202, the third device 203, the fourth device 204, the fifth device 205, and the sixth device 206 through a local area network. For example, a network (e.g., the local area network) for establishing connection between the user devices 200 may be appropriately selected. For example, Bluetooth, Bluetooth Low Energy (BLE), Wi-Fi Direct, near-field communication (NFC), ultra-wide band (UWB) communication, or infrared communication may be used to establish a connection between the user devices 200. Further, in an embodiment, the user devices 200 may establish connection using a mesh network (e.g., ZigBee or Z-Wave) via short-range wireless communication.

In an embodiment, in addition to the first device 201, at least one of the second device 202, the third device 203, the fourth device 204, the fifth device 205, and the sixth device 206 may be directly connected to the server 300 through the second network 199. For example, a user device may establish a stand-alone connection with the second network 199 without depending on the first device 201.

In an embodiment, the user devices 200 may have various methods for connecting to each other according to device information (e.g., a device component). For example, when at least one of the user devices 200 is an IP-based (IP address) device, the user device may establish connection with the second network 199 using a service set identifier (SSID), and when the user device is not an IP-based device (e.g., BLE, ZigBee, or Z-Wave), the user device may establish connection with the second network 199 using a user device (e.g., the first device 201) or a hub device (not shown).

In an embodiment, at least one of the user devices 200 may broadcast an advertising packet to provide a finding (or locating) function when lost. For example, when determining that the second device 202 is lost, the second device 202 may broadcast a packet including various pieces of information including identification information about the second device 202. The packet may be broadcast such that electronic devices located within a predetermined communication range other than the second device 202 may receive the packet. In various embodiments of the disclosure, the packet or the advertising packet may be understood as a signal, a message, or a beacon for recognizing that a device has been lost.

In an embodiment, at least one of the user devices 200 may determine whether the user device is lost according to various criteria. For example, when a first time (e.g., 48 hours) has elapsed from a time of last connection of the second device 202 to the first device 201 as a parent terminal or a main terminal and/or when a second time (e.g., 24 hours) shorter than the first time has elapsed from the time of the last connection of the second device 202 to the first device 201 but a remaining battery level is a reference value (e.g., 30%) or less, the second device 202 may determine that the second device 202 is lost. Regarding the first time, the second time, and/or the remaining battery level, various loss determination criteria may be applied to according to a user configuration or a manufacturer's criterion (or criteria) and the disclosure is not limited to the aforementioned examples.

In various embodiments, a description of the electronic device 101 with reference to FIG. 1 may be appropriately applied to the user devices 200. For example, when the first device 201 of the user is a smartphone, the first device 201 and the electronic device 101 may be the same device. For example, when the third device 203 of the user is an earbud having no display, the description of the electronic device 101 other than a description of the display module 160 may be appropriately applied to the third device 203.

In an embodiment, the server 300 may correspond to the server 108 of FIG. 1. When the user loses any one of the user devices 200, the server 300 may provide a function of identifying the location of the lost device. For convenience of explanation, various embodiments disclosed herein illustrate examples in which the first device 201 identifies the location of the lost second device 202 when the second device 202 among the user devices 200 is lost.

In an embodiment, the electronic device 400 may be a device of a user different from an owner of the second device 202. The electronic device 400 is near the lost second device 202, and may thus directly or indirectly obtain an advertising packet broadcast from the second device 202. The electronic device 400 may include a short-range communication circuit for receiving a signal broadcast by the lost second device 202 using a short-range communication technique (e.g., BLE). Further, the electronic device 400 may include a location measurement circuit (e.g., a GPS circuit) for measuring (or determining) the location of the electronic device 400. In addition, the electronic device 400 may include a long-distance communication circuit (e.g., a communication circuit supporting the cellular network and/or a Wi-Fi network) for transmitting information about the second device 202 and the location of the electronic device 400 to the server 300.

In an embodiment, the electronic device 400 may also be a device of the same type (e.g., a smartphone) as the first device 201. Therefore, the description of the electronic device 101 made with reference to FIG. 1 may be partly or entirely applied to the electronic device 400. In addition, a description of a configuration or function of the first device 201 made herein may also be applied to the electronic device 400. However, the electronic device 400 may be any electronic device supporting the foregoing communication function without being limited to the foregoing description.

Figure 3:
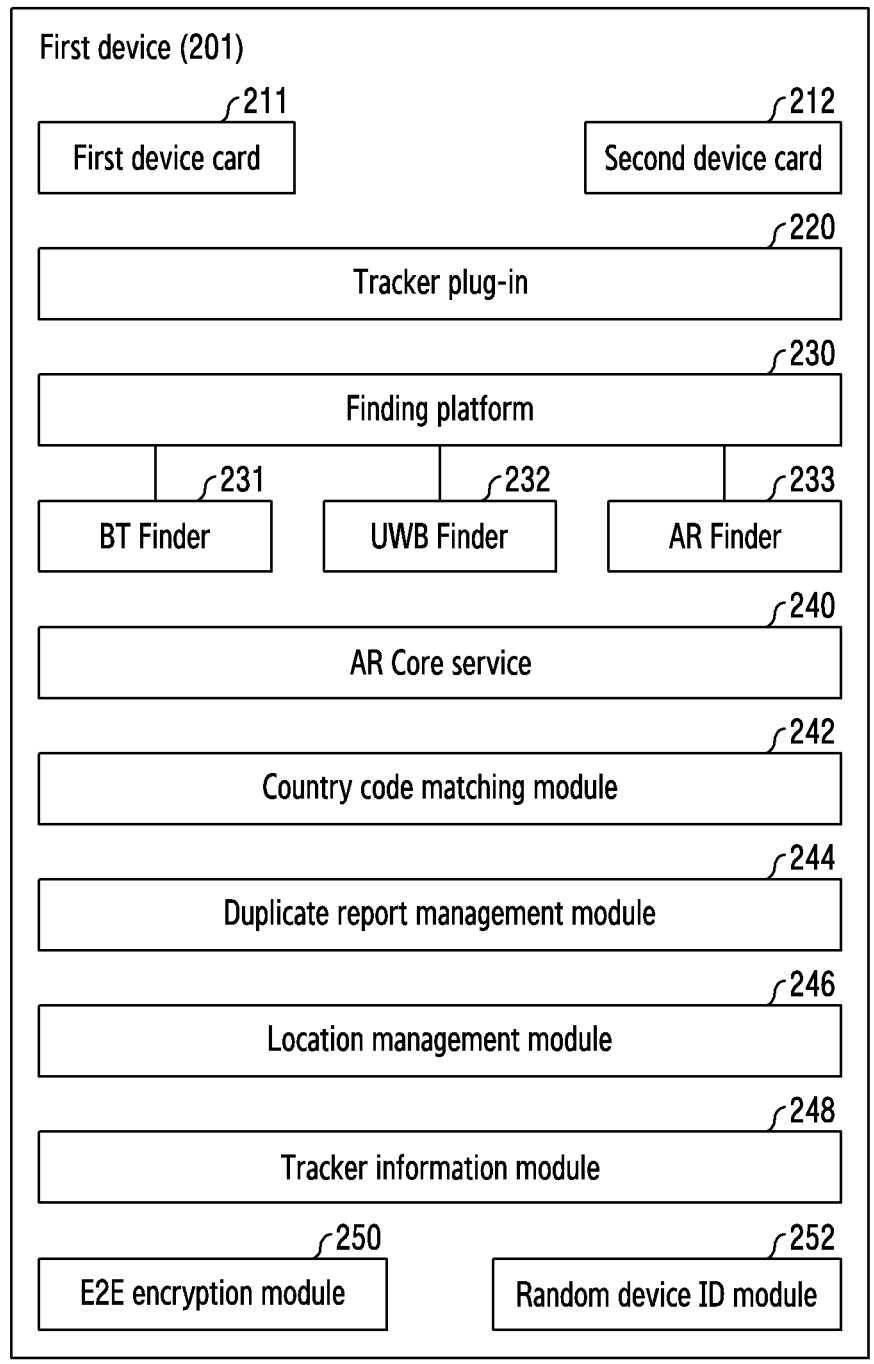
FIG. 3 is a diagram illustrating example modules related to various functions of an example electronic device according to various embodiments.

FIG. 3 is a diagram illustrating example modules related to various functions of an electronic device according to various embodiments.

Various functions described in FIG. 3 may be understood as functions supported by the first device 201 in terms of finding a lost device. Further, the functions may be understood as functions supported by the electronic device 400 in terms of processing an advertising packet obtained from the lost device. As described above, the first device 201 and the electronic device 400 are distinguished only in terms of whether the devices are a device of the user looking for the lost device or a device of the user providing help in finding the lost device, and the functions described in FIG. 3 may be provided for both the first device 201 and the electronic device 400. Hereinafter, a description will be made based on the first device 201.

A function or operation described with reference to FIG. 3 may be understood as a function performed, for example, by a processor of the first device 201. The processor may execute instructions (e.g., instructions) stored in a memory to implement a software module shown in FIG. 3, and may control hardware (e.g., the communication module 180 of FIG. 1) related to the function. The term "module" as used in the description of FIG. 3, may include various circuitry (e.g., processing circuitry) and/or executable program instructions.

In an embodiment, the first device 201 may manage at least one device card. For example, a first device card 211 for the first device 201 may be registered in the first device 201. Further, a second device card 212 for the second device 202 having a history of interworking with the first device 201 may be registered in the first device 201. The device card (e.g., the first device card 211 and the second device card 212) may include information, such as a name and/or identification information of a device, a state of the device, battery information about the device, a location history of the device, a current location of the device, and/or a message related to the device. In an embodiment, the information included in the first device card 211 and/or the second device card 212 may be configured and/or changed by the user. For example, the user of the first device 201 and/or the second device 202 may configure a name related to the first device 201 and/or the second device 202, a device type (e.g., type), or policy information.

In an embodiment, the first device 201 and the second device 202 may share a same user account, and the first device card 211 and the second device card 212 may be registered with the same user account. For example, when an input to identify the location of the user's devices interworking with the first device 201 is received by the first device 201, the first device 201 may provide a user interface (UI) displaying information about the first device card 211 and the second device card 212 stored in the memory to a display (e.g., the display module 160 of FIG. 1). An illustrative UI is described below with reference to FIG. 7.

In an embodiment, the first device 201 and the second device 202 may be devices having different user accounts. When the first device 201 and the second device 202 have different user accounts and are identified as devices mutually related to each other, the first device card 211 and the second device card 212 may be registered with the same user account. For example, when a first user of the first device 201 and a second user of the second device 202 are identified as having a family relationship with each other, information about the second device 202 may be identified through a first user account of the first user of the first device 201. Although the following description is based on a same user for convenience, various embodiments may be applied even when the users of the first device 201 and the second device 202 are different.

In an embodiment, a tracker plug-in 220 may refer, for example, to a module for registering a user device. For example, the first device 201 may drive the tracker plug-in 220. The tracker plug-in 220 may provide an easy setup POP, or may provide a QR triggering function or a manual onboarding function. For example, the user may scan a QR code placed on one surface of the second device 202 or a product case using a camera (e.g., the camera module 180 of FIG. 1) mounted in the first device 201, thereby registering the second device 202 in the server 300 by linking with a user account.

In an embodiment, a finding platform 230 may, for example, perform a function of finding a lost device. The finding platform 230 may control hardware to effectively find the lost device according to a distance from the lost device. For example, the finding platform 230 may operate along with a BT (Bluetooth) finder 231, a UWB (ultra wide band) finder 232, and/or an AR (augmented reality) finder 233. For example, the BT finder 231 may control a Bluetooth communication circuit, the UWB finder 232 may control a UWB communication circuit, and the AR finder 233 may control the display.

In an embodiment, the BT finder 231 may operate when the distance between the first device 201 and the second device 202 is within a first distance (e.g., about 100 m). When the distance between the first device 201 and the second device 202 is within the first distance, the finding platform 230 may control the BT finder 231 to receive a packet from the second device 202 using a short-range communication circuit supporting Bluetooth communication and/or BLE communication or to establish connection for short-range communication with the second device 202.

In an embodiment, the UWB finder 232 may operate when the distance between the first device 201 and the second device 202 is within a second distance (e.g., about 50 m) shorter than the first distance. The finding platform 230 may control the UWB finder 232 to activate the UWB communication circuit connected to a plurality of UWB antennas in order to receive a signal of a UWB channel used for positioning. The finding platform 230 may receive a UWB signal received from the second device 202 using the UWB communication circuit, and may estimate the location of the second device 202, based on an arrival time and/or arrival angle of a signal received by each of the plurality of UWB antennas.

In an embodiment, when the second device 202 is within a short distance, the AR finder 233 may implement augmented reality on the display, thereby visually assisting the user in finding the second device 202. Here, the short distance may be substantially the same as the second distance, or may be within a third distance shorter than the second distance. The finding platform 230 may output image data obtained through the camera to a display, and may control the AR finder 233 to display the location of the second device 202 identified through the UWB finder 232 on a screen output on the display. When the first device 201 does not effectively receive the UWB signal from the second device 202 (e.g., when reception sensitivity is a threshold value or less), the AR finder 233 may induce or prompt the first device 201 to have a position (angle) suitable to receive the UWB signal via the display.

In an embodiment, when the AR finder 233 operates, an AR core service 240 may be activated together. The AR core service 240 may control the first device 201 to access a person/object recognition database stored in the memory and/or an AR service providing server in order to enhance an augmented reality environment.

In an embodiment, the BT finder 231, the UWB finder 232, and/or the AR finder 233 included in the finding platform 230 may operate simultaneously or selectively, based on the distance to the second device 202. For example, when the distance between the first device 201 and the second device 202 is the second distance (e.g., within about 50 m), the BT finder 231 and the UWB finder 232 may operate simultaneously, or the UWB finder 232 may selectively operate.

In an embodiment, when the first device 201 receives an advertising packet from any lost device (e.g., the second device 202), a country code matching module 242 may determine a country for which information about the lost device is provided or a server belonging to the country. For example, the country code matching module 242 may operate when the first device 201 serves as the electronic device 400 (e.g., serves as a device of the user providing assistance to find the lost device). In an embodiment, when determining the country or the server belonging to the country, the first device 201 (or the electronic device 400) may use data of a country code-server matching database (DB) 330 included in the server (e.g., a server 300 of FIG. 4). For example, the first device 201 (or the electronic device 400) may store the data of the country code-server matching DB 330 obtained from the server 300, and may transmit the data to the second device 202 connected to the first device 201 (or the electronic device 400). According to an embodiment, the first device 201 (or the electronic device 400) may store a country or data (e.g., a country code-server matching DB) belonging to the country through a device process or software upgrading. For example, the first device 201 (or the electronic device 400) may update over-the-air (OTA) software as a software upgrade. For example, OTA software updating may include open mobile alliance (OMA) download, firmware OTA (FOTA), or plain FTP.

In an embodiment, when the first device 201 receives the advertising packet from any lost device, a duplicate report management module 244 may manage an operation of rebroadcasting the received advertising packet or reporting the advertising packet to the server. For example, when the advertising packet received from any lost device satisfies a predetermined condition, the duplicate report management module 244 may perform an operation of reporting/rebroadcasting to the server, and when the advertising packet does not satisfy the predetermined condition, the duplicate report management module 244 may not perform the operation of reporting/rebroadcasting to the server. For example, the duplicate report management module 244 may operate when the first device 201 serves as the electronic device 400.

In an embodiment, a location management module 246 may manage the current location and/or a location change history of the second device 202 obtained from the server 300. In addition, the location management module 246 may identify and/or manage the location of the first device 201 by controlling a location measurement circuit, such as the GPS included in the first device 201.

In an embodiment, a tracker information module 248 may manage the type of second device 202 and/or identification information about the second device 202. The tracker information module 248 may operate when the first device 201 serves as the electronic device 400. For example, the tracker information module 248 may store and/or manage a device type (e.g., a smartwatch, an earphone, a headphone, or a tablet PC), a communication type (e.g., whether BLE is supported, whether Bluetooth is supported, whether a cellular network is supported, or whether UWB communication is supported), and/or the identification information (e.g., a unique device ID, a network identification ID, or a user-defined ID) of the second device 202.

In an embodiment, an E2E encryption module 250 may perform end-to-end encryption. The E2E encryption module 250 may operate when the first device 201 serves as the electronic device 400. For example, when the electronic device 400 transmits a message including identification information about the lost device and location information about the electronic device 400 to the server 300 in response to receiving the advertising packet from any lost device (e.g., the second device 202), the E2E encryption module 250 may apply an encryption algorithm to the message. When the E2E encryption module 250 encrypts the message using an encryption key related to the lost device, a device having a decryption key corresponding to the encryption key of the lost device may obtain location information about the lost device. For example, when the electronic device 400 encrypts the message including the identification information about the second device 202 and the location information about the electronic device 400 with a public key of the second device 202 and transmits the message to the server 300, the first device 201 may obtain the encrypted information about the lost second device 202 from the server 300, and may then decrypt the information with a private key of the second device 202, thereby identifying the information about the second device 202 (=location of the electronic device 400). For example, the first device 201 may obtain the private key of the second device 202 during a process of registering the second device 202 in a user account, registering the second device 202 in the server 300, or a process of pairing with the second device 202.

In an embodiment, a random device ID module 252 may change an identification ID of a device into a random ID using a predetermined algorithm. The random device ID module 252 may operate when the first device 201 serves as the electronic device 400. For example, when the electronic device 400 receives the advertising packet from the second device 202, the electronic device 400 may change an identification ID of the second device 202 into a random ID, and may transmit a message to the server 300. The first device 201 may identify the ID of the second device 202 from the random ID using the predetermined algorithm.

Figure 4:
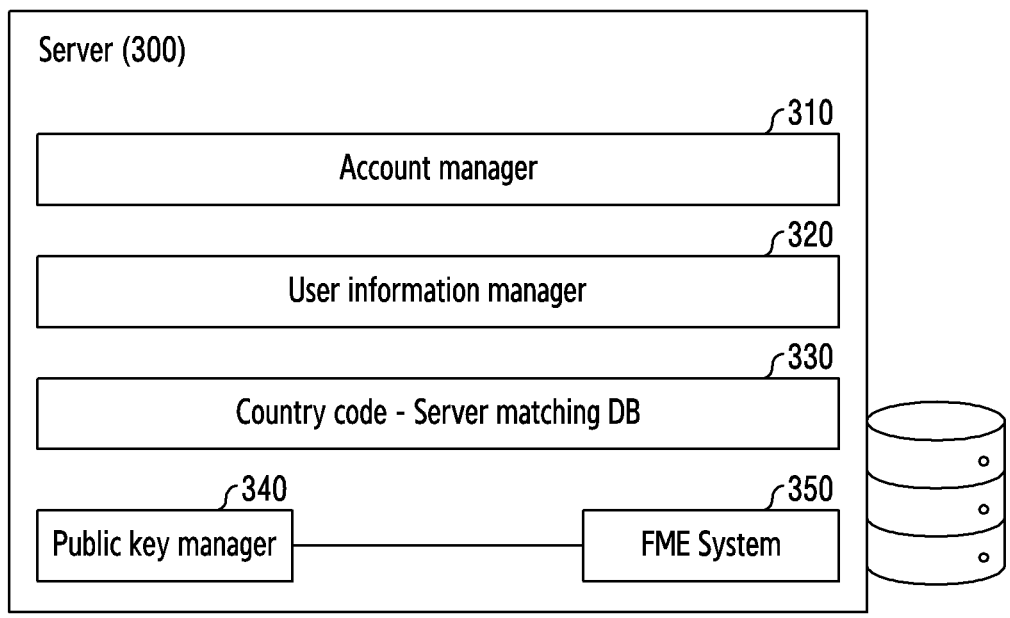
FIG. 4 is a diagram illustrating example modules related to various functions of an example server according to various embodiments.

FIG. 4 is a diagram illustrating example modules related to various functions of an example server according to various embodiments.

Referring to FIG. 4, the server 300 may include an account manager 310, a user information manager 320, a country code-server matching database (DB) 330, a public key manager 340, and a Find My Everything (FME) system 350, each of which may include various circuitry (e.g., processing circuitry) and/or executable program instructions. The components of the server 300 shown in FIG. 4 are classified from a functional viewpoint to implement various embodiments, and the server 300 may be configured with a plurality of pieces of hardware (e.g., a plurality of processors for the server and a storage device). Further, the server 300 may, for example, include a plurality of servers. For example, the server 300 may include a first server for providing a lost device search service in a first country and a second server for providing a lost device service in a second country.

In an embodiment, the server 300 may include the account manager 310. The account manager 310 may manage a user account registered in the server 300 and/or at least one device connected to the user account. For example, when the first device 201, the second device 202, and the third device 203 are registered with a first user account, even though a request related to the second device 202 is received from the first device 201, the account manager 310 may allow the first device 201 to access information about the second device 202 since the first device 201 and the second device 202 are connected to the same first user account.

In an embodiment, the server 300 may include the user information manager 320. The user information manager 320 may manage registration, addition, deletion, and/or modification of user information associated with the user account.

In an embodiment, the country code-server matching DB 330 may maintain and update a database in which a country code is matched with a server providing a lost device search service. For example, the server 300 may manage the country code-server matching DB 330 as updated data, and may provide information about a server associated with a country code to at least one of devices registered with a user account in the server 300 when a change occurs. For example, the server 300 may provide the database to the first device 201 or the electronic device 400 registered in the server 300. In an embodiment, the electronic device 400 may determine a server for which location information is provided, based on country information included in an advertising packet obtained from a lost device.

In an embodiment, a country code may, for example, be based on an international country calling code representing a country. For example, the United States has an international calling country code of +1, Korea +82, Vietnam +84, United Kingdom +44, and the like, in which case the country code-server matching DB 330 may include data such as the data shown in Table 1.

TABLE 1

| Country | Country code | Server address |
| --- | --- | --- |
| South Korea | 82 | 168.121.63.2 |
| USA | 1 | 164.124.101.2 |
| Vietnam | 84 | 180.182.54.1 |
| UK | 44 | 149.112.132.1 |
| Japan | 81 | 120.123.222.1 |
| Philippines | 63 | 180.124.191.2 |
| ... | ... | ... |

In various embodiments, a country code is not limited to an international calling country code, and may be any information for identifying a country. For example, a country expression using a letter (e.g., Korea: KR, USA: US, or France: FR), such as a domain code, or a format like a mobile country code (MCC) (e.g. Germany 262, Korea: 450, or France: 208) may be also be used as a country code. The foregoing method for expressing a country code is for illustration, and a country code may be expressed in bits.

In an embodiment, the public key manager 340 may manage a public key of devices registered in the server 300. The public key may, for example, be managed by user account or by device. For example, one public key may be configured per user account. In an example, when five devices are connected with the same user account, five different public keys may be assigned to the five devices, respectively.

In an embodiment, the FME system 350 may perform processing for providing a lost device search service. For example, when a request for a public key for the lost second device 202 is received from the electronic device 400, the FME system 350 may obtain the public key for the second device 202 from the public key manager 340, and may provide the obtained public key to the electronic device 400. For example, the FME system 350 may identify a user account with which the second device 202 is registered through the account manager 310. Further, the FME system 350 may identify a country corresponding to the user account and/or the second device 202 through the user information manager 320. In addition, the FME system 350 may identify whether the request from the electronic device 400 is transmitted to a server of an appropriate country through the country code-server matching DB 330, and may provide at least some of data stored in the country code-server matching DB 330 to the electronic device 400 when an incorrect country is designated or it is impossible to identify the information about the second device 202. For example, the FME system 350 may maintain the database in which the country code is matched with the server providing the lost device search service to be up-to-date, and may provide at least some of the updated data to the electronic device 400.

Figure 5:
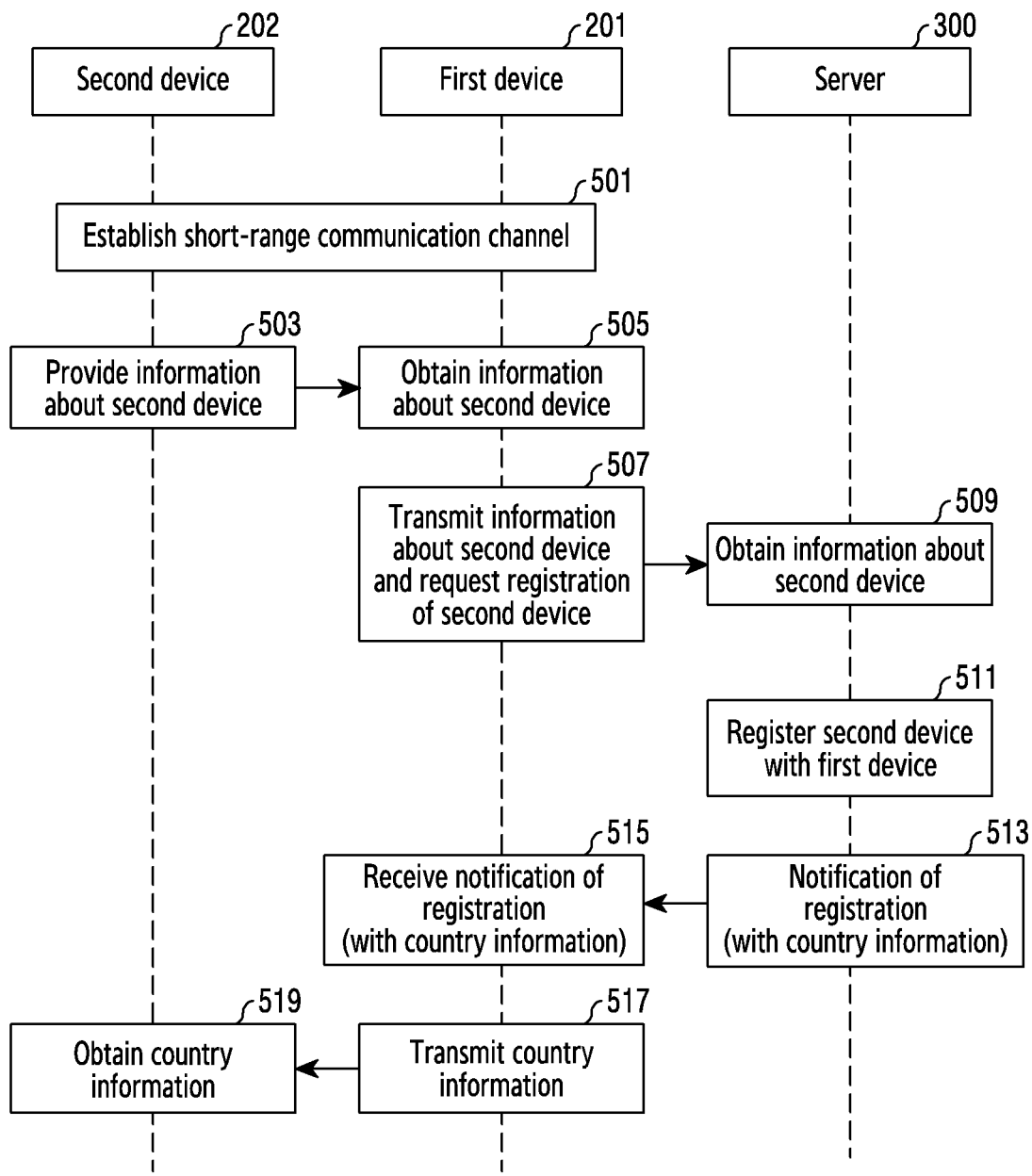
FIG. 5 is a flowchart illustrating a first device registering a second device in an example server according to various embodiments.

FIG. 5 is a flowchart illustrating a first device registering a second device in an example server according to various embodiments.

Referring to FIG. 5, in operation 501, the first device 201 and the second device 202 may establish a short-range communication channel. For example, the short-range communication channel may be device-to-device connection, such as Bluetooth or Wi-Fi Direct, but is not limited thereto.

According to an embodiment, in operation 503, the second device 202 may provide information about the second device 202 to the first device 201 through the short-range communication channel. The information about the second device 202 may include, for example, the type of the second device 202 (e.g., a smartwatch or a tablet PC), unique identification information (e.g., a device ID), a manufacturer of the second device 202, hardware information about the second device 202 (e.g., processor performance, a memory capacity, and/or a battery capacity), software information about the second device 202 (e.g., the type and version of an operating system, an installed application, and/or whether a device search service is supported), and/or information about communication performance (e.g., whether Bluetooth is supported, whether BLE is supported, whether UWB is supported, whether a cellular network is supported, whether Wi-Fi is supported, whether NFC is supported, and/or whether MST is supported).

According to an embodiment, in operation 505, the first device 201 may obtain information about the second device 202. The first device 201 may store the obtained information about the second device 202 in a memory (e.g., the memory 130 of FIG. 1) of the first device 201.

According to an embodiment, in operation 507, the first device 201 may transmit the information about the second device 202 to a server 300, and may request registration of the second device 202. For example, the first device 201 may transmit a message in a designated format to the server 300, and the message in the designated format may include information about the first device 201, user information about the first device 201, a request to register the second device 202, and/or the information about the second device 202. For example, when the first device 201 is registered with a first user account registered in the server 300, the first device 201 may transmit the message to the server 300, thereby requesting registration of the second device 202 with first user account as well. In an example, when the first device 201 is registered with the first user account registered in the server 300 and the second device 202 is registered with a second user account registered in the server 300, the first device 201 may transmit the message to the server 300, thereby requesting registration of the second device 202 with a third user account (e.g., a group account) including the first user account and the second user account, or requesting deletion of the information about the second device 202 registered with the second user account and registration of the second device 202 with the first user account.

According to an embodiment, in operation 509, the server 300 may obtain the information about the second device 202 from the first device 201. The server 300 and the first device 201 may be connected through a predetermined network (e.g., a cellular network or a Wi-Fi network), and the server 300 may obtain the information about the second device 202 transmitted from the first device 201 through the predetermined network.

According to an embodiment, in operation 511, the server 300 may register the second device 202 with the first device 201. For example, an account manager 310 of the server 300 may also register the second device 202 with the first user account corresponding to the first device 201 using the information obtained from the first device 201.

According to an embodiment, in operation 513, the server 300 may transmit a notification indicating that the second device 202 is registered to the first device 201. The notification may include country information about the second device 202. For example, when the server 300 provides a service in South Korea, country information corresponding to South Korea may be included in the second device 202. In an example, when country information about the first user account registered in the server 300 is South Korea, country information about all user devices 200 registered with the first user account may be configured to South Korea.

According to an embodiment, in operation 515, the first device 201 may receive a registration notification from the server 300. The registration notification may include the country information. However, in an embodiment, when the country information about the second device 202 is already registered in the second device 202 at a time of manufacture of the second device 202 or the first device 201 directly configures country information about the first device 201 or country information about the user account of the first device 201 as the country information about the second device 202, the country information may be omitted from the registration notification received from the server 300.

In an embodiment, operation 501 to operation 515 may be referred to as a registration procedure or an onboarding procedure of the second device 202. In an embodiment, the registration procedure or onboarding procedure may include a procedure for storing the identification information (ID) about the second device 202 (e.g., a tracker) in the server 300.

According to an embodiment, in operation 517, the first device 201 may transmit the country information to the second device 202. As described above, the country information may be the country information received from the server 300 or country information known (or stored) by the first device 201 (e.g., the country information registered for the first device 201 or the country information corresponding to the user account of the first device 201).

According to an embodiment, in operation 519, the second device 202 may obtain the country information from the first device 201. In an embodiment, the country information about the second device 202 may be already registered in a storage space (e.g., the memory 130 of FIG. 1) of the second device 202. In an embodiment, when the second device 202 already knows the country information thereabout, operation 517 and operation 519 may be omitted. For example, the first device 201 may know that the country information about the second device 202 has already been registered through operation 503 and operation 505. The second device 202 may broadcast an advertising packet including the country information in a state of being lost, which will be described later.

Figure 6:
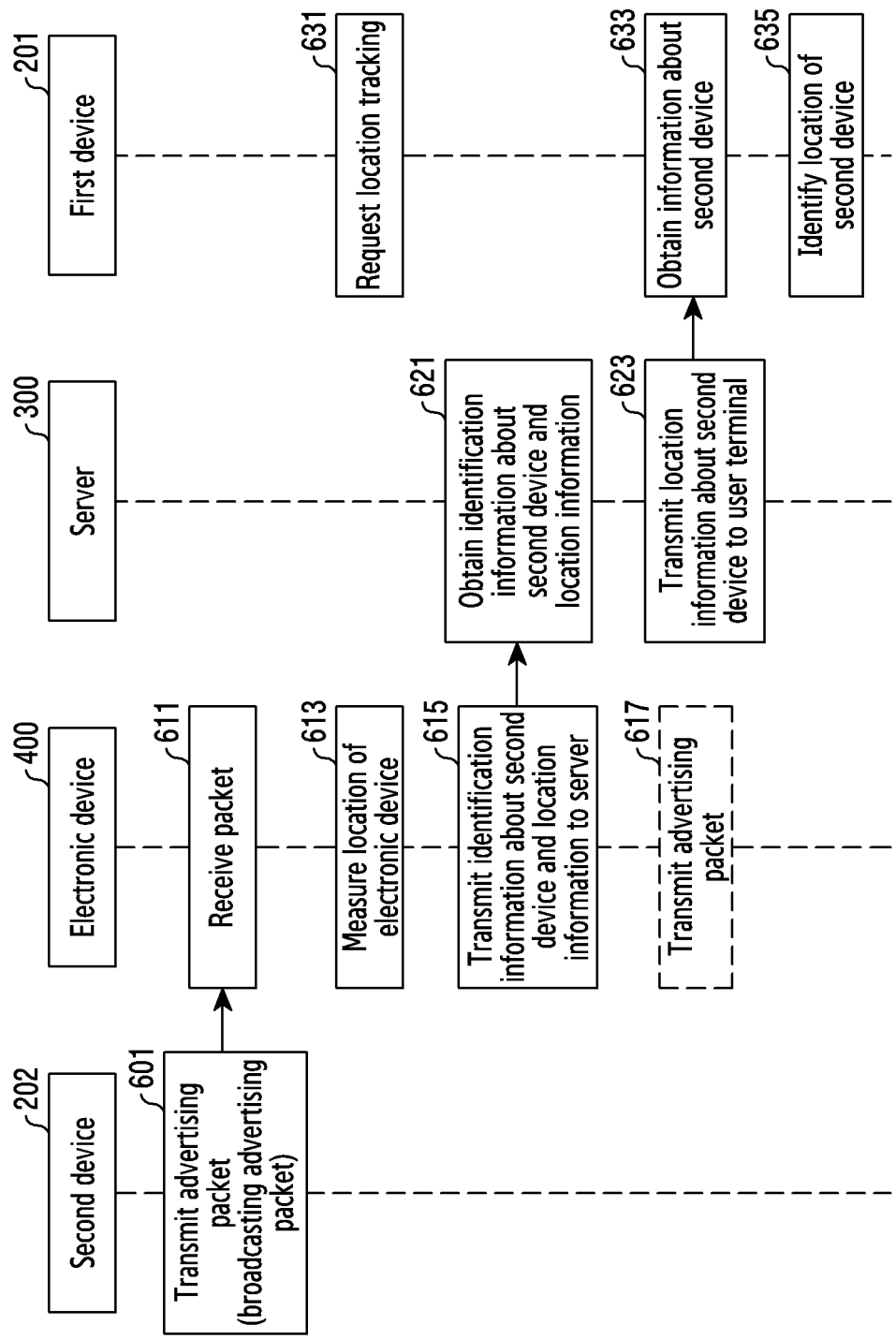
FIG. 6 is a flowchart illustrating an example finding system tracking the current location of a lost device according to various embodiments.

FIG. 6 is a flowchart illustrating an example finding system tracking the current location of a lost device according to various embodiments. For reference, FIG. 6 illustrates a situation in which, in the system of FIG. 2, the first device 201 and the second device 202 are user devices sharing the same user account and the second device 202 has been lost. The electronic device 400 is an arbitrary device unrelated to the user of the first device 201, and may be understood as a device located at a distance to be able to receive a packet broadcast from the second device 202.

According to an embodiment, in operation 601, the second device 202 may broadcast (or transmit) an advertising packet using a designated communication protocol. The designated communication protocol may correspond to a type of low-power short-range communication protocol to minimize and/or reduce battery consumption. For example, the designated communication protocol may be BLE.

In an embodiment, the second device 202 may broadcast the advertising packet when detecting a state of being lost. As described above, a condition for the second device 202 to determine the state of being lost may be variously configured. However, in an embodiment, the second device 202 may broadcast the advertising packet regardless of detecting the state of being lost. For example, the second device 202 may repeatedly broadcast the advertising packet for a predetermined time (e.g., 15 minutes) every predetermined period (e.g., 1 hour). In an example, the second device 202 may repeatedly broadcast the advertising packet for the predetermined time at each designated time (e.g., user configured time).

According to an embodiment, in operation 611, the electronic device 400 may receive an advertising packet broadcast by an external device. For convenience of explanation, it is hereinafter assumed that the electronic device 400 receives the advertising packet broadcast by the second device 202.

In an embodiment, the electronic device 400 may include various communication circuits. For example, the electronic device 400 may include a first wireless communication circuit supporting short-range communication to receive an advertising packet. Further, the electronic device 400 may include a second wireless communication circuit supporting long-distance communication (e.g., cellular communication) to communicate with the server 300. In addition, the electronic device 400 may include a location measurement circuit (e.g., a GPS) to measure a location thereof. The location measurement circuit may include a positioning system using a base station or a Wi-Fi access point (AP) or a positioning system using an NFC beacon in addition to a positioning system using satellite navigation, such as the GPS.

In an embodiment, since the advertising packet broadcast by the second device 202 uses the designated short-range communication protocol, receiving the advertising packet may, for example, mean that the second device 202 and the electronic device 400 exist within a communication distance allowed by the short-range communication protocol. For example, when the electronic device 400 receives the advertising packet through BLE, the electronic device 400 may be estimated to be located within about 100 m from the second device 202. Accordingly, from a macroscopic viewpoint, the location of the electronic device 400 may be regarded as the same as the location of the second device 202.

According to an embodiment, in operation 613, the electronic device 400 may measure the location of the electronic device 400 using the location measurement circuit. The electronic device 400 may identify the location (e.g., latitude and/or longitude coordinates) of the electronic device 400, based on a measurement result.

According to an embodiment, in operation 615, the electronic device 400 may transmit measured location information and identification information about the second device 202 to the server 300. For example, the electronic device 400 may transmit a message including the identification information (e.g., a unique ID and/or serial number) about the second device 202 and the location information to the server 300 using the second wireless communication circuit. The electronic device 400 may specify that the location information included in the message is location information about the electronic device 400, but may simply include the location information alone without specifying a subject of the location information.

According to an embodiment, the electronic device 400 may transmit the message to the server 300, and, in operation 617, may then broadcast (transmit) an advertising packet. For example, when the advertising packet obtained by the electronic device 400 from the second device 202 is referred to as a first packet and the advertising packet rebroadcasted by the electronic device 400 is referred to as a second packet, the second packet may include content (data) substantially the same or less than that of the first packet. Here, the electronic device 400 may allow some fields of the second packet to have different values from those of the first packet. For example, the electronic device 400 may configure a multi-hop count field value differently to indicate that the electronic device 400 is an indirect transmitter of the advertising packet rather than a direct transmitter. For example, when a multi-hop count of the first packet is n, a multi-hop count of the second packet may be configured to be n+1. In an embodiment, the multi-hop count of the advertising packet directly generated by the second device 202 may be configured to 0 (e.g., n=0). According to an embodiment, the second packet generated based on the first packet may be defined in a format slightly different from that of the first packet. For example, at least some fields among a plurality of fields included in the format of the first packet may be omitted from the format of the second packet.

In various embodiments, the electronic device 400 may broadcast the advertising packet before or substantially simultaneously with transmitting the message to the server 300. Operation 617 may simply not be performed.

According to an embodiment, in operation 621, the server 300 may obtain the message including the identification information about the second device 202 and the location information from the electronic device 400. When there is a request to track the location of the second device 202 from the first device 201 before and/or after obtaining the message (e.g., operation 631), the server 300 may transmit location information about the external device (e.g., the second device 202) to the first device 201 in operation 623. For example, the first device 201 may transmit the request to track the location (or identify the location) of the second device 202 to the server 300 in operation 631, and the server 300 may transmit information about the identified location of the second device to the first device 202 in response to the request received from the first device 201. For example, the server 300 may transmit information about the location of the second device 202 most recently identified to the first device 201.

According to an embodiment, in operation 633, the first device 201 may obtain the location information about the second device 202 from the server 300. In operation 635, the first device 201 may identify the location of the second device 202, based on the information obtained from the server 300. Operation 631, operation 633, and/or operation 635 may be implemented through an application providing a location identification service provided in the first device 201, which will be described in greater detail below with reference to FIG. 7.

According to an embodiment, when obtaining the identification information about the second device 202 and the location information from the electronic device 400 in operation 621, the server 300 may determine whether a location tracking request (e.g., operation 631) is received from the first device 201 registering the second device 202 with a first account in the server 300 or a different device having the first account. For example, when the location tracking request (e.g., operation 631) is not received from the first device 201, the server 300 may not perform operation 623. According to an embodiment, although not shown, the server 300 may transmit a response message to the electronic device 400, based on whether the location tracking request (e.g., operation 631) is received from the first device 201. For example, when receiving the location tracking request (e.g., operation 631) from the first device 201, the server 300 may transmit, to the electronic device 400, a response message indicating that the identification information about the second device 202 and the location information are transmitted to the first device 201. In an example, when not receiving the location tracking request (e.g., operation 631) from the first device 201, the server 300 may request the electronic device 400 not to transmit the identification information about the second device 202 and the location information for a designated time. According to an embodiment, the electronic device 400 may perform an operation of broadcasting the advertising packet (e.g., operation 617), based on a response from the server 300.

Figure 7:
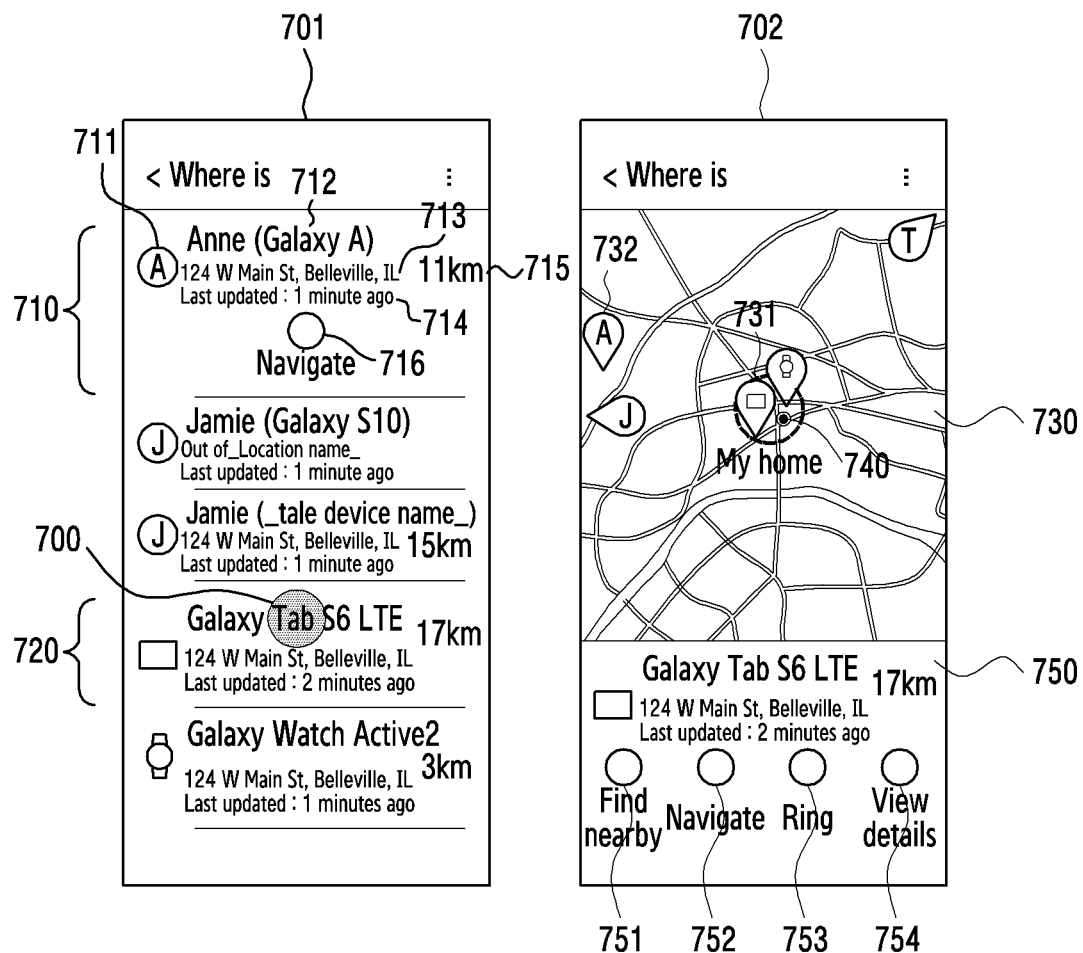
FIG. 7 illustrates an example user interface for a first device to identify locations of user devices according to various embodiments.

FIG. 7 illustrates an example user interface for a first device to identify locations of user devices according to various embodiments.

Referring to FIG. 7, a first screen 701 may be an execution screen of an application providing a location identification service of the first device 201. The first device 201 may display information about user devices registered in the first device 201 in the form of a list. According to an embodiment, the first screen 701 may present a list including an item (not shown) corresponding to a first device card 211 and an item corresponding to a second device card 212. For example, the list of the first screen 701 may include a first item 710 corresponding to a smartphone (e.g., Galaxy A) representing the first device 201 registered with a user account of the first device 201 and a second item 720 corresponding to an arbitrary tablet PC (e.g., Galaxy Tab S6 LTE) registered with the user account. In the following description, a description of the first item 710 and/or the second item 720 may also be applied to other items (e.g., "Jamie (Galaxy S10)", "Jamie (_tale device name_)", and/or "Galaxy Watch Active2") not specified on the first screen 701.

In an embodiment, each item included in the list may include various pieces of information. For example, the first item 710 may include at least one of an icon 711 indicating the smartphone, a nickname (e.g., Anne) and model name (Galaxy A) 712 of the smartphone, a last identified location 713 (e.g. 124 W Main St, Belleville, IL), a time when the location is last identified 714 (e.g. Last updated: 1 minute ago), the distance from the current location of the first device 201 to the smartphone 715, and a navigation menu 716 for executing a map application or a map function, based on the current location of the first device 201 and the last identified location 713. Some of the foregoing items illustrated above may be omitted. For example, when the location of the device is not identified, at least some of the last identified location 713, the time when the location is last identified 714, or the navigation menu 716 may not be present.

In an embodiment, the first device 201 may automatically perform operation 631 when the application is executed. In an embodiment, the first device 201 may perform operation 631 according to a user input after the application is executed. In an embodiment, the first device 201 may perform operation 631 every predetermined period (e.g., 12 hours), and may update the locations of the user devices 200 registered in the first device 201.

In an embodiment, when a user input 700 to select the second item 720 among a plurality of items included in the list occurs, the first device 201 may present a second screen 702 on a display of the first device 201. The second screen 702 may be, for example, a UI generated based on the second device card 212.

In an embodiment, the second screen 702 may include a map area 730 and a second device card area 750. For example, the map area 730 may be present on an upper portion (area) of the second screen 702, and the second device card area 750 may be present on a lower portion (area). However, this example is merely for illustration, and the second device card area 750 may be disposed at a location different from that in the illustrated example. For example, the second device card area 750 may be provided in a floating form on a map occupying most of the second screen 702. The location or size of the second device card area 750 may be moved/enlarged/reduced by a user input.

In an embodiment, the locations of the user devices identified through the server 300 may be present in the map area 730. The locations of the user devices may be present in the form of icons. For example, the location of the smartphone corresponding to the first item 710 may be present as a first icon 732 on the map. The location of the tablet PC corresponding to the second item 720 selected by the user input 700 may be present as a second icon 731 on the map. In an embodiment, the location of the tablet PC corresponding to the second item 720 selected by the user input 700 may be located in the center of the map area 730. The current location 740 of the first device 201 may be present in the map area 730. In an embodiment, the current location 740 of the first device 201 may be located in the center of the map area 730.

In an embodiment, the second device card area 750 may include a device action menu 751, a navigation menu 752, a ring menu 753, and/or a view details menu 754.

In an embodiment, when the device action menu 751 is selected, the first device 201 may identify whether the second device 202 (e.g., the tablet PC corresponding to the second item 720) is adjacent to the first device 201. For example, when the device action menu 751 is selected, the first device 201 may present and/or update the map area 730, based on the location of the first device 201 and location information about the user devices 200 received from the server 300. Further, for example, upon selecting the device action menu 751, the first device 201 may retrieve whether the second device 202 is adjacent using a designated communication protocol (e.g., BLE). When connected to the second device 202 using the designated communication protocol, the first device 201 may drive an AR finder 233, and may present the location of the second device 202 through an augmented reality interface or may determine whether to present the location of the second device 202.

In an embodiment, when the navigation menu 752 is selected, the first device 201 may present a route to the identified location of the second device 202 in the map area 730. In an embodiment, when the ring menu 753 is selected, the first device 201 may attempt to make a call to the second device 202, or attempt to make the second device 202 emit a designated sound. For example, when the second device 202 supports a call function, the first device 201 may attempt to make a call to the second device 202 in response to selection of the ring menu 753. In an example, when the second device 202 is connected to the first device 201 through a predetermined local area communication network, the first device 201 may transmit a designated signal to the second device 202 through the local area communication network in response to selection of the ring menu 753. Upon receiving the designated signal, the second device 202 may generate a predefined notification signal (e.g., an alarm, vibrations, and/or light emission) in response to the designated signal, thereby reporting the location thereof.

In an embodiment, when the view details menu 754 is selected, the first device 201 may present detailed information about the second device 202. For example, the first device 201 may present the state of the second device 202 according to various conditions. For example, when the second device 202 is connected to the first device 201 or another device (e.g., the fifth device 205 or the sixth device 206) among the user devices 200, the first device 201 may present a first state message, such as "Nearby Finding". The message may be displayed in a pop-up form or be present in the second device card area 750 of the second device 202. When the second device 202 is not connected to the first device 201 or another device among the user devices 200, but is not in an "offline finding" state, the first device 201 may present a second state message, such as "Not in Range Finding". Here, the "offline finding state" may refer to a state in which the second device 202 is determined to be lost or a state in which a threshold time has elapsed since last connection of the second device 202 to one of the user devices 200.

In an embodiment, when the second device 202 is not connected to the first device 201 or another device among the user devices 200 and is not in the "offline finding" state, but there is an attempt to find the second device 202, the first device 201 may present a third state message, such as "Lost Mode Finding". When the second device 202 is not connected to the first device 201 or another device among the user devices 200 and is in the "offline finding" state, the first device 201 may present a fourth state message, such as "Update Mode Finding". When the first device 201 attempts to connect to the second device 202, a fifth state message, such as "Connecting", may be present. In an embodiment, the first to fifth state messages related to the device action menu 751 may be included in the first device card 211 and/or the second device card 212 of FIG. 3.

The foregoing first to fifth state messages are examples, and fewer or more state messages may be appropriately configured by a manufacturer or a user according to various embodiments. For example, the first device 201 may provide remaining battery level information about the second device 202. Further, the first device 201 may present the location (location information) of the second device 202, based on a time stamp. In addition, the first device 201 may present the current state of the second device 202 using an appropriate message (device card message). For example, the first device 201 may present, on the display, a message indicating whether the second device 202 is adjacent to the first device 201, whether the second device 202 is adjacent to another device (e.g., the fourth device 204) among the user devices 200, where the second device 202 is last located, whether the second device 202 is being searched for, or whether the second device 202 has been found.

In an embodiment, information presented in the second device card area 750 is not limited to the illustrated example, and at least one of information related to the device action menu 751 and information in the view details menu 754 (e.g., the remaining battery level information, the location information, and/or the device card message) may be present.

Figure 8:
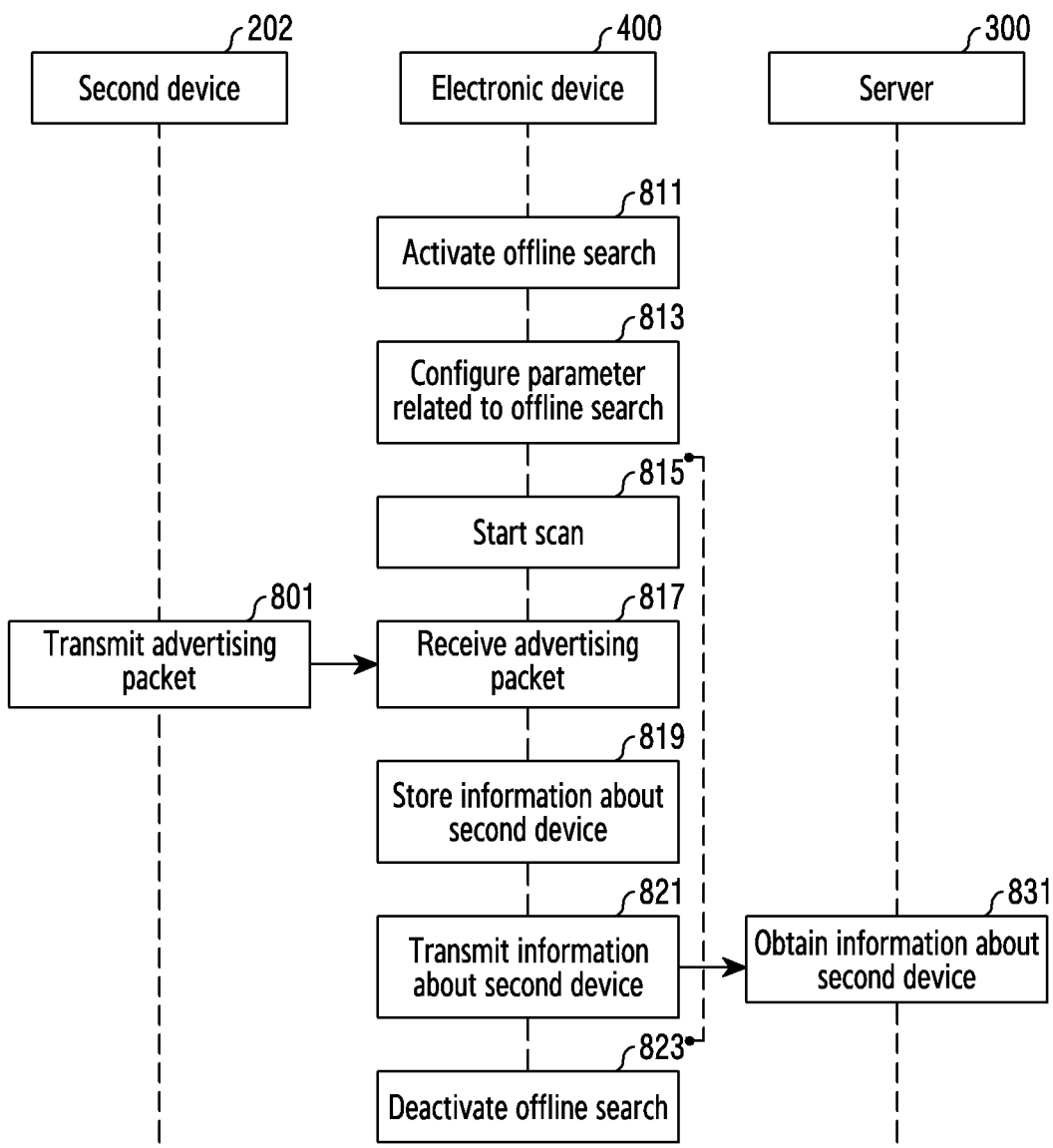
FIG. 8 is a flowchart illustrating an example electronic device performing a scan to find any external device according to various embodiments.

FIG. 8 is a flowchart illustrating an example electronic device performing a scan to find any external device according to various embodiments.

According to an embodiment, in operation 811, the electronic device 400 may activate an offline search. For example, a user of the electronic device 400 may activate an offline search function in a settings menu. In an example, the offline search function may be periodically activated or always activated. In an example, the offline search function may be activated only in a designated time period (e.g., 9 a.m. to 6 p.m.).

According to an embodiment, in operation 813, the electronic device 400 may configure parameter(s) related to the offline search in response to activation of the offline search function. For example, parameters, such as a scan period, a scan window, a scan interval, scan duration, and/or wakeup intent, may be configured. Here, the scan period may refer to a time in which a scan occurs once. The scan window may refer to a time for which the scan is actually performed during the scan period. For example, when the scan period is 2000 ms and the scan window is 200 ms, a short-range communication circuit may perform a first scan for 200 ms after waking up, may maintain a sleep state for remaining 1800 ms, and may then perform a second scan for 200 ms at a time after a lapse of 2000 ms after waking up.

The scan duration may refer to a time for which a scan is maintained according to the scan period. For example, the electronic device 400 may maintain a scan performed every 2000 ms for 1 hour. The scan interval may refer to an interval between scan durations. For example, when the scan duration is one hour and the scan interval is four hours, the electronic device 400 may maintain a scan for one hour from 12 a.m., may maintain the sleep state for three hours, and may then maintain a scan for one hour from 4 a.m. after a lapse of four hours from 12 a.m.

According to an embodiment, operation 813 may be omitted. When operation 813 is omitted, a parameter setting related to the offline search may adopt a designated setting value (e.g., a default value).

According to an embodiment, in operation 815, the electronic device 400 may start a scan. The scan of the electronic device 400 may be performed according to a rule defined by the parameters related to the scan, configured in operation 813. While the scan is performed, the electronic device 400 may activate a first communication circuit supporting short-range communication to obtain an advertising packet obtained from an external device (e.g., the second device 202).

According to an embodiment, the second device 202 may broadcast the advertising packet using a designated short-range communication protocol in operation 801. For example, the second device 202 may broadcast the advertising packet including identification information and a country code of the second device 202 and/or a multi-hop count at regular time intervals using a BLE protocol.

In an embodiment, the second device 202 may broadcast the advertising packet according to a change in the state of a network. For example, the second device 202 may determine whether the network is currently available. For example, when a network connection between the second device 202 and a server 300 or a first device 201 is lost, the second device 202 may determine whether the lost network connection is due to an airplane mode. For an application of the second device 202 to identify the current state of the network, the application (e.g., an application providing a location search service) may reside in a memory of the second device 202. In an embodiment, when not in the airplane mode, the second device 202 may configure an alarm, and may broadcast the advertising packet when a configured alarm time arrives. Subsequently, when the network is restored (e.g., the connection with the first device 201 is restored), the second device 202 may cancel the configured alarm, and may stop broadcasting the advertising packet.

According to an embodiment, after the scan is started, the electronic device 400 may receive the advertising packet from the external device, for example, the second device 202 in operation 817. The electronic device 400 may obtain information about the second device 202 from the information included in the received advertising packet in operation 817, and may store the obtained information in a memory of the electronic device 400 in operation 819.

According to an embodiment, in operation 821, the electronic device 400 may transmit the information about the second device 202 to the server 300, based on information (e.g., the country code) received from the second device 202. The electronic device 400 may include the information about the second device 202 and location information. Here, the location information may be the location of the electronic device 400 measured by a location measurement circuit of the electronic device 400. The electronic device 400 may obtain an encryption key for encrypting the information transmitted to the server 300 from the server 300 to improve security, may encrypt the information about the second device 202 with the obtained encryption key, and may transmit the encrypted information to the server 300. For example, the electronic device 400 may transmit at least part of the information about the second device 202 to the server 300, may obtain an encryption key from the server 300, may encrypt the information about the second device 202 and/or the location information with the obtained encryption key, and may transmit the information about the second device 202 and/or the location information to the server 300.

According to an embodiment, the server 300 may obtain the information about the second device 202 and/or the location information from the electronic device 400 in operation 831, and may provide information about the location of the second device 202 to the first device 201 in response to a request from the first device 201 (e.g., operation 623 of FIG. 6).

In an embodiment, the electronic device 400 may repeat operation 815, operation 817, operation 819, and/or operation 821 for a predetermined time, for example, the scan duration, and may deactivate the offline search function in operation 823 when the scan duration expires. However, in an embodiment, the offline search function may be deactivated due to various events, such as a user input or a remaining battery level of the electronic device 400.

Figure 9:
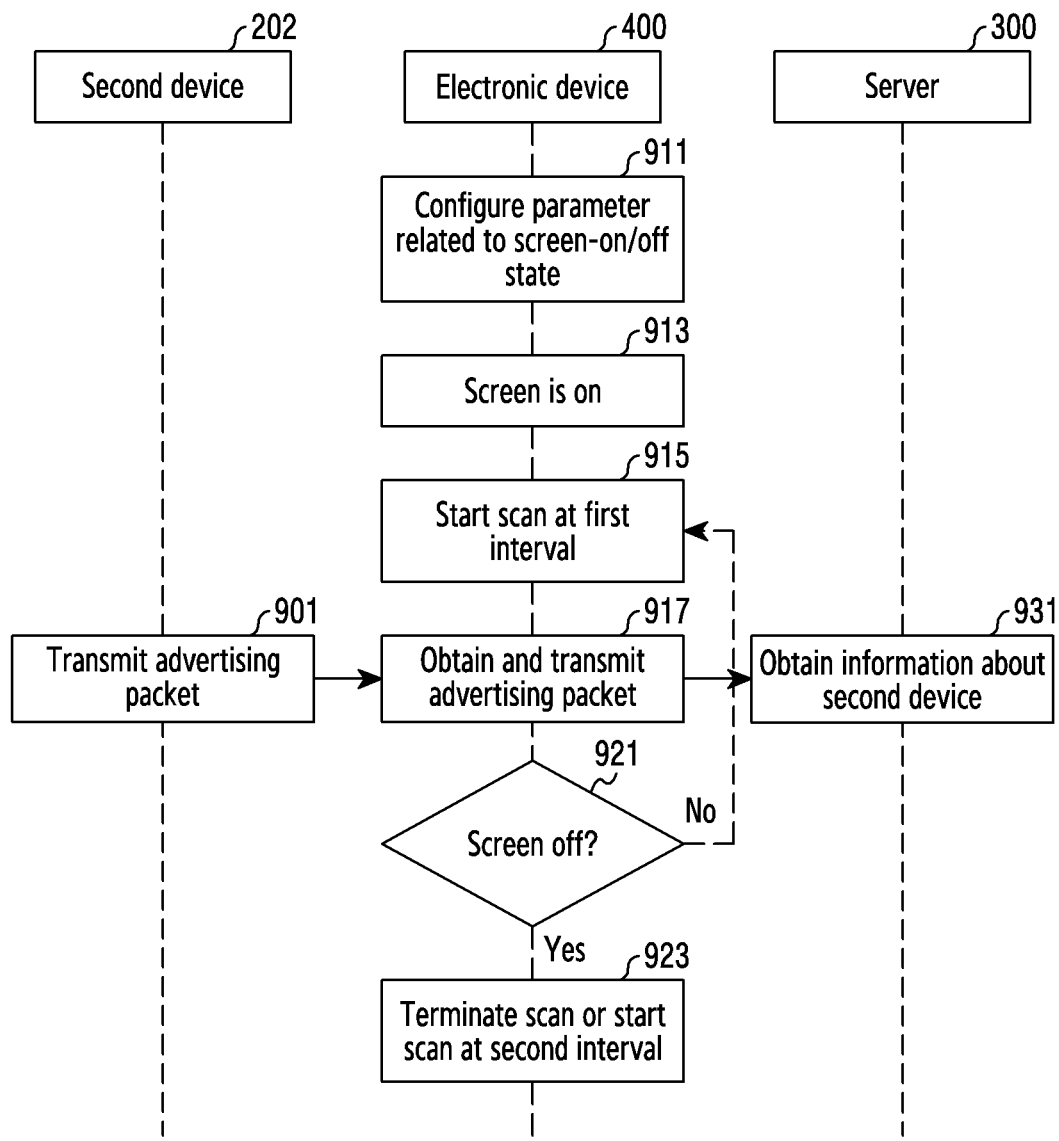
FIG. 9 is a flowchart illustrating adjusting a scan interval according to a screen-on/off state of an example electronic device according to various embodiments.

FIG. 9 is a flowchart illustrating adjusting a scan interval according to a screen-on/off state of an example electronic device according to various embodiments.

Referring to FIG. 9, in operation 911, the electronic device 400 may configure a parameter(s) related to a screen-on/off state. For example, the electronic device 400 may configure the parameters related to the offline search function in response to activation of the offline search function in operation 813 of FIG. 8, and some parameters may be configured differently depending on whether a screen (display) of the electronic device 400 is on or off. For example, the electronic device 400 may perform a scan according to a first period (e.g., 1000 ms) in a screen-on state, but may perform a scan according to a second period (e.g., 1 hour) in a screen-off state. In an example, the electronic device 400 may perform a scan with a scan window of a first length (e.g., 200 ms) in the screen-on state, but may perform a scan with a scan window of a second length (e.g., 100 ms) in the screen-off state.

According to an embodiment, in operation 913, the screen of the electronic device 400 may be turned on. When the electronic device 400 is switched to the screen-on state, the electronic device 400 may start scanning an advertising packet broadcast from an external device at a first interval in operation 915.

According to an embodiment, in operation 901, a second device 202 may continuously broadcast an advertising packet using a designated short-range communication protocol as in operation 801 of FIG. 8. While performing a scan at the first interval, the electronic device 400 may obtain the advertising packet from the external device, for example, the second device 202, and may transmit information about the second device 202 and/or location information obtained from the advertising packet to a server 300 in operation 917.

According to an embodiment, the server 300 may obtain the information about the second device 202 and/or the location information from the electronic device 400 in operation 931, and may transmit information about the location of the second device 202 to the first device 201 in response to a request from the first device 201. (e.g., operation 623 of FIG. 6)

According to an embodiment, in operation 921, the electronic device 400 may determine whether the screen of the electronic device 400 is turned off. When the screen of the electronic device 400 is not turned off (i.e., maintained in the on state), the electronic device 400 may continuously perform the scan at the first interval. When the screen of the electronic device 400 is turned off, the electronic device 400 may terminate the scan, or may perform a scan at a second interval configured to be longer than the first interval in operation 923.

Figure 10:
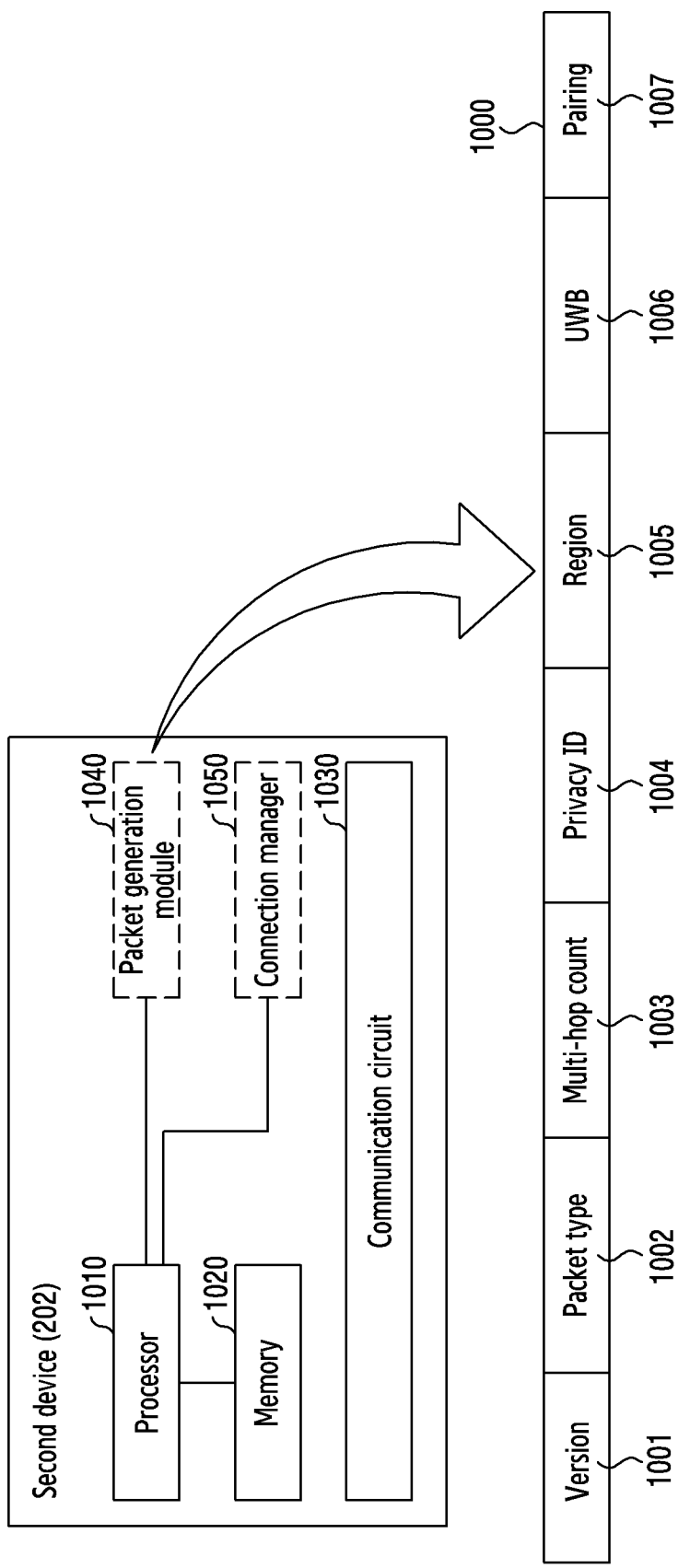
FIG. 10 is a diagram illustrating a configuration of a second device and a data structure of a packet broadcast by the second device according to various embodiments.

FIG. 10 is a diagram illustrating a configuration of a second device and a data structure of a packet broadcast by the second device according to various embodiments.

Referring to FIG. 10, the second device 202 may include a processor (e.g., including processing circuitry) 1010, a memory 1020, and a communication circuit 1030. The components of the second device 202 shown in FIG. 10 are for illustration, and the components described with reference to FIG. 1 may be appropriately applied to the second device 202. A description of FIG. 1 may be applied to components corresponding to those of FIG. 1 among the components of FIG. 10.

In an embodiment, the processor 1010 may include various processing circuitry and execute an instruction from the memory 1020, and may implement a packet generation module 1040 and/or a connection manager 1050. The packet generation module 1040 and the connection manager 1050 may, for example, be understood as software modules implemented by executing a program code stored in the memory 1020. An operation described as being performed by the packet generation module 1040 or the connection manager 1050 in the following description may be understood as being performed by the processor 1010.

Referring to FIG. 10, the processor 1010 may drive the packet generation module 1040 by executing instructions stored in the memory 1020. The packet generation module 1040 may generate an advertising packet 1000 including information about the second device 202. The processor 1010 may provide the generated advertising packet 1000 to the communication circuit 1030 through (using) the connection manager 1050, and the communication circuit 1030 may broadcast the advertising packet 1000 using a designated protocol.

In an embodiment, the advertising packet 1000 may include fields of a version 1001, a packet type 1002, a multi-hop count 1003, a privacy ID 1004, a region 1005, a UWB 1006, and/or a pairing 1007.

In an embodiment, the version 1001 may refer, for example, to a version of the advertising packet. Since the advertising packet needs to be based on a rule shared between the second device 202 that broadcasts the advertising packet and an electronic device 400 that receives and interprets the advertising packet, the version of the advertising packet may be used to determine a rule for the electronic device 400 receiving the advertising packet to interpret data included in the advertising packet. For example, when receiving an old version of an advertising packet rather than a latest version, the electronic device 400 may interpret the advertising packet according to a rule corresponding to the old version. In an example, when the version of the electronic device 400 is lower than the version of the advertising packet, the electronic device 400 may update the version through a server (e.g., the server 108 of FIG. 1).

In an embodiment, the packet type 1002 may, for example, indicate whether the advertising packet is a packet supporting a multi-hop. Additionally and/or alternatively, the packet type 1002 may indicate information about whether the second device 202 is currently in an offline mode (e.g., offline finding) or an online mode.

In an embodiment, the multi-hop count 1003 may, for example, indicate how many times the advertising packet is transmitted. For example, when the advertising packet is broadcast directly from the second device 202, the multi-hop count of the advertising packet may be defined as 0. When a different device receiving the advertising packet from the second device 202 rebroadcasts the advertising packet, the multi-hop count of the rebroadcast advertising packet may be defined as a number of 1 or greater.

In an embodiment, the privacy ID 1004 may, for example, be unique identification information about the second device 202. Additionally and/or alternatively, the privacy ID 1004 may be a random ID generated according to a predetermined algorithm, based on the unique identification information about the second device 202.

In an embodiment, the region 1005 may, for example, include country information about the second device 202. For example, the region 1005 may be country information received from the server 300 when the second device 202 is on board and/or information about an address of the server 300. For example, the region 1005 may be information related to data included in the country code matching module 242 of FIG. 3 or the country code-server matching DB 330 of FIG. 4.

In an embodiment, the UWB 1006 may, for example, indicate whether the second device 202 supports UWB communication. The advertising packet 1000 may further include information about whether the second device 202 supports E2E or MCF in addition to the UWB.

In an embodiment, the pairing 1007 may, for example, include information about whether the second device 202 is a device operating alone or a device operating as a pair, such as earbuds, and whether the second device 202 is paired when the second device 202 is a device operating as a pair.

Figure 11:
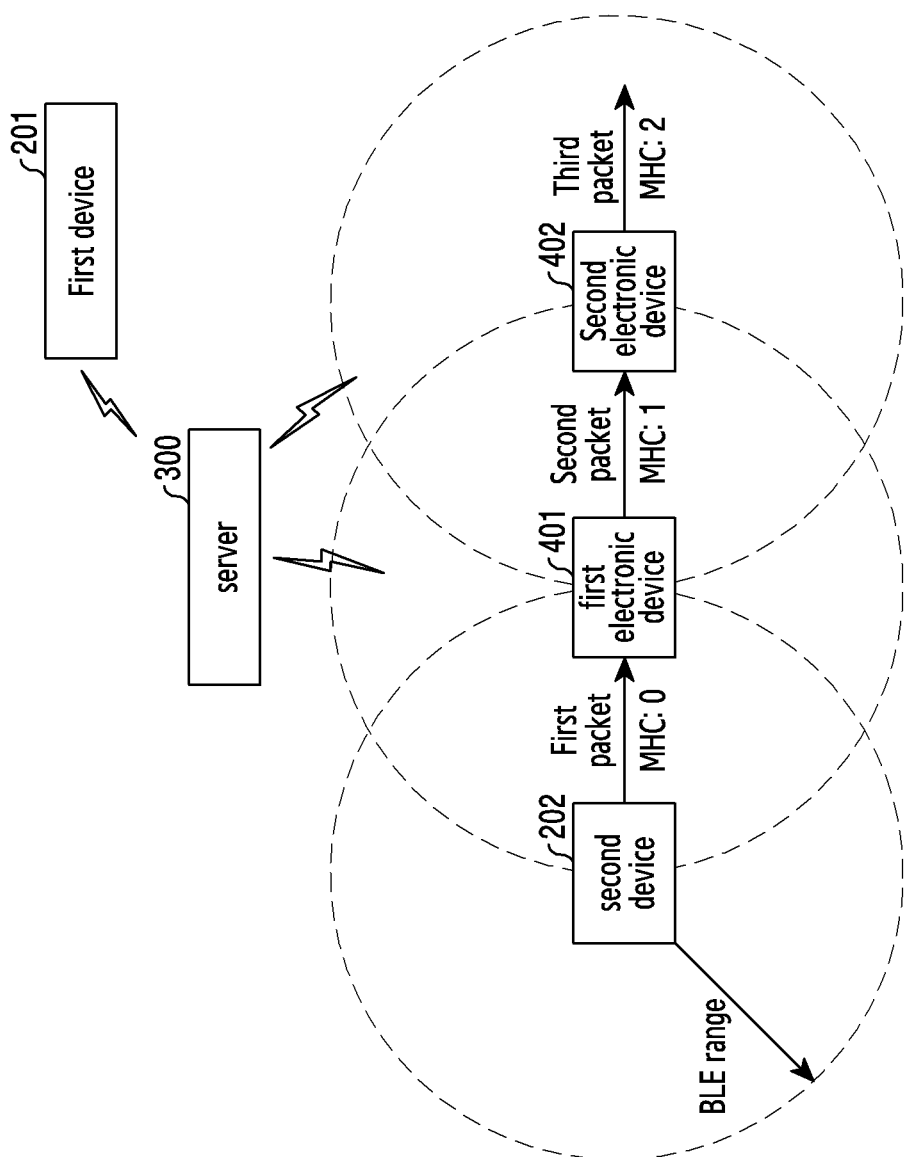
FIG. 11 is a conceptual diagram illustrating an example system for identifying the location of a user device changing a multi-hop count according to various embodiments.

FIG. 11 is a conceptual diagram illustrating an example system for identifying the location of a user device changing a multi-hop count according to various embodiments.

Referring to FIG. 11, a second device 202 may broadcast an advertising packet (e.g., the advertising packet 1000 of FIG. 10) using a short-range wireless communication circuit. For example, the advertising packet 1000 may have a multi hop count (MHC) of a first value. In the embodiment of FIG. 11, the packet broadcasted by the second device 202 may have MHC=0. In the following description, the packet having a multi-hop count of 0 broadcast by the second device 202 is referred to as a first packet.

In an embodiment, the first packet may be obtained by a first electronic device 401 located within a predetermined communication distance (e.g., a BLE range) from the second device 202. For example, when the first packet is broadcast through BLE communication, the predetermined communication distance may be about 50 m.

In an embodiment, the foregoing description of the electronic device 400 may be applied to the first electronic device 401 and a second electronic device 402. Further, descriptions of the electronic device 101 of FIG. 1 and the first device 201 among the user devices 200 may also be applied to the first electronic device 401 and the second electronic device 402.

In an embodiment, when obtaining the first packet, the first electronic device 401 may identify the multi-hop count of the first packet. When the multi-hop count of the first packet is the predefined first value (e.g., 0), the first electronic device 401 may obtain the location of the first electronic device 401 using a location measurement circuit, and may provide location information about the first electronic device 401 together with identification information about the second device 202 included in the first packet to a server 300. When a request to identify the location of the second device 202 is made by the first device 201, the server 300 may provide location information about the second device 202, based on the information received from the first electronic device 401.

In an embodiment, after receiving the first packet, the first electronic device 401 may broadcast a second packet using a short-range communication circuit. For example, when the second device 202 broadcasts the first packet using BLE communication, the first electronic device 401 may also broadcast the second packet using BLE communication. The second packet may have a second value greater than the first value of the multi-hop count of the first packet. For example, when the first value is 0, the second value may be configured to 1.

In an embodiment, the second electronic device 402 may obtain the second packet using a short-range communication circuit. The second electronic device 402 may identify the identification information about the second device 202 and the multi-hop count from the second packet. However, since the multi-hop count identified by the second electronic device 402 has a value of 1 rather than 0, the second electronic device 402 may identify that a different device (=the first electronic device 401) has already received the packet having a multi-hop count of 0 from the second device 202 and reported the location to the server 300 and the second packet received by the second electronic device 402 is a packet that has been rebroadcast by the different device. For example, even though receiving the second packet, the second electronic device 402 may not perform location measurement for reporting the identification information about the second device 202 and location information to the server 300.

In an embodiment, after receiving the second packet, the second electronic device 402 may broadcast a third packet using the short-range communication circuit. For example, when the first electronic device 401 broadcasts the second packet using BLE communication, the second electronic device 402 may also broadcast the third packet using BLE communication. The third packet may have a third value greater than the second value of the multi-hop count of the second packet. For example, when the second value is 1, the third value may be configured to 2.

In an embodiment, the second electronic device 402 may also exist within the BLE range (e.g., about 50 m) based on the second device 202. That is, both the first electronic device 401 and the second electronic device 402 may obtain the advertising packet having the multi-hop count of 0 from the second device 202. In this case, a description for preventing the first electronic device 401 and the second electronic device 402 from redundantly transmitting a report to the server 300 will be described later with reference to FIG. 14.

Figure 12:
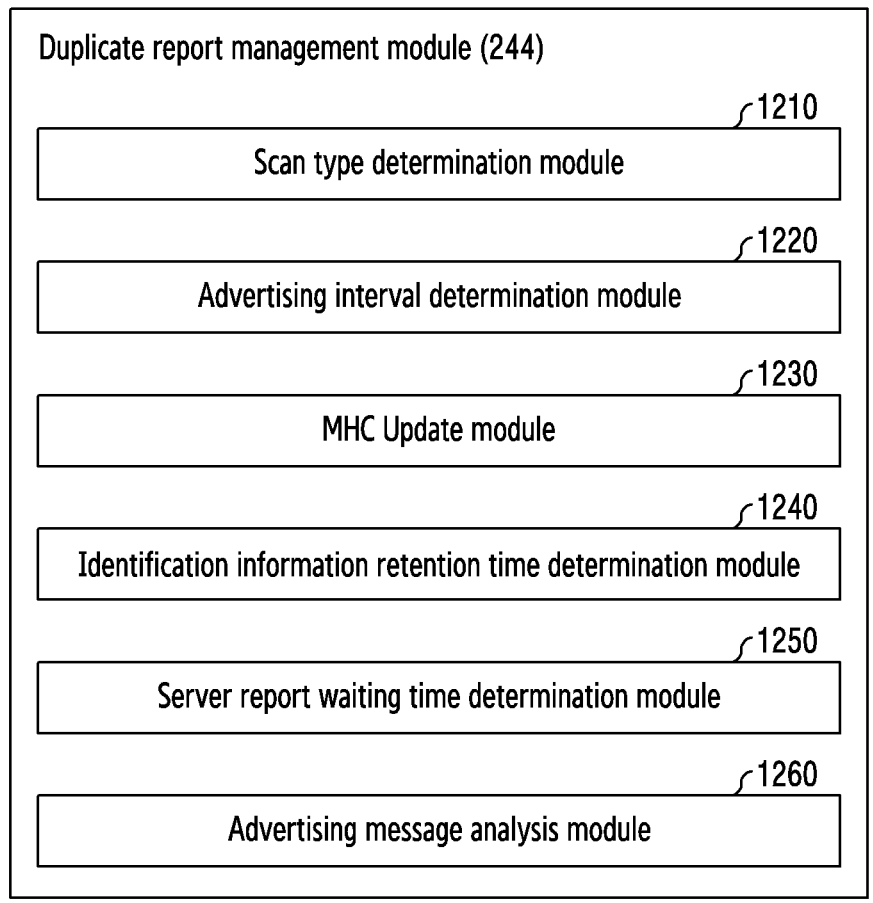
FIG. 12 is a diagram illustrating various modules related to a function of preventing information about a lost device from being redundantly reported according to various embodiments.

FIG. 12 is a diagram illustrating various modules related to a function of preventing information about a lost device from being redundantly reported according to various embodiments. FIG. 12 may be understood as a detailed configuration of a duplicate report management module (e.g., the duplicate report management module 244 of FIG. 3) of the first device 201 or the electronic device 400 shown in FIG. 2.

In an embodiment, the duplicate report management module 244 may include a scan type determination module 1210, an advertising interval determination module 1220, an MHC update module 1230, an identification information retention time determination module 1240, a server report waiting time determination module 1250, and an advertising message analysis module 1260. Operations performed by a plurality of modules described with reference to FIG. 12 may be understood as being performed by at least one processor included in any electronic device (e.g., the electronic device 400, the first electronic device 401, the second electronic device 402, or the like) that obtains an advertising packet 1000 from the lost device (e.g., the second device 202).

In an embodiment, the scan type determination module 1210 may, for example, determine a scan period, a scan window, a scan interval, scan duration, a scan count per day, and/or the maximum number of devices to be scanned in each scan. For example, the scan type determination module 1210 may configure various parameters described with reference to FIG. 8 and FIG. 9. Further, the scan type determination module 1210 may adjust the parameters according to a screen-on/off state or a remaining battery level. For example, the scan type determination module 1210 may include different scan periods (e.g., a first scan period and a second scan period) according to the screen screen-on/off state. For example, in the screen-on state, information about the first scan period (e.g., operation 915 of FIG. 9) may be used, and in the screen-off state, information about the second scan period (e.g., operation 923 of FIG. 9) and scan duration information may be used.

According to an embodiment, when receiving an advertising packet from an external device (e.g., the second device 202) in the screen-off state, the electronic device (e.g., the electronic device 400, the first electronic device 401, the second electronic device 402, or the like) may store (retain) the advertising packet related to the external device (e.g., the second device 202) in a memory (e.g., operation 819 of FIG. 8). The electronic device (e.g., the electronic device 400, the first electronic device 401, the second electronic device 402, or the like) may transmit wakeup intent to an application providing a location identification service in order to transmit information about the second device 202 to a server (e.g., the server 300).

According to an embodiment, in the screen-on state, the electronic device (e.g., the electronic device 400, the first electronic device 401, the second electronic device 402, or the like) may transmit the wakeup intent to the application providing the location identification service without storing (retaining) the advertising packet related to the external device (e.g., the second device 202) in the memory.

In an embodiment, when the remaining battery level decreases to a reference value (e.g., 30%) or lower, the scan type determination module 1210 may increase the scan interval, and may reduce the scan duration, thereby reducing battery consumption due to a scan. For example, when the screen-on state is maintained, the scan type determination module 1210 may determine to perform a scan up to five times in a manner of detecting up to five devices per scan. In this case, first electronic devices 401 may report up to 25 devices to the server 300.

In an embodiment, the advertising interval determination module 1220 may, for example, determine an advertising interval to prevent a different electronic device, such as the second electronic device 402, located adjacent to the first electronic device 401 from performing a duplicate report. For example, after receiving a first packet, the first electronic device 401 may advertise a second packet after a lapse of an interval configured by the advertising interval determination module 1220. Further, the advertising interval determination module 1220 may determine a time for which broadcasting of the second packet is maintained. For example, the advertising interval determination module 1220 may determine to broadcast the second packet for five minutes at an interval of 30 seconds.

In an embodiment, the MHC update module 1230 may, for example, manage a multi-hop count of the second packet to be broadcast. For example, the MHC update module 1230 may configure the multi-hop count of the second packet to have a greater value than a multi-hop count recorded in the first packet. For example, the MHC update module 1230 may configure a value of the multi-hop count of the first packet plus 1 as the multi-hop count of the second packet, but is not limited thereto.

In an embodiment, the identification information retention time determination module 1240 may, for example, determine a retention time of identification information about the second device 202 obtained from the first packet obtained through the scan. For example, when the scan is performed according to a predetermined period for 10 minutes in the screen-on state, the identification information retention time determination module 1240 may determine 10 minutes, which is the same as a time for which the scan is maintained, as a retention time for identification information obtained through the scan to prevent the same identification information from being redundantly reported. However, the above retention time is for illustration, and the retention time of the identification information may be appropriately configured to five minutes or a time shorter or longer than five minutes.

In an embodiment, the server report waiting time determination module 1250 may, for example, determine when to report the identification information about the scanned second device 202 and/or a location to the server 300 after a time when the scan is performed.

In an embodiment, the advertising message analysis module 1260 may, for example, analyze data included in the advertising packet 1000. For example, the advertising message analysis module 1260 may identify the multi-hop count included in the first packet, and may determine whether to perform location measurement and/or a report to the server.

Figure 13:
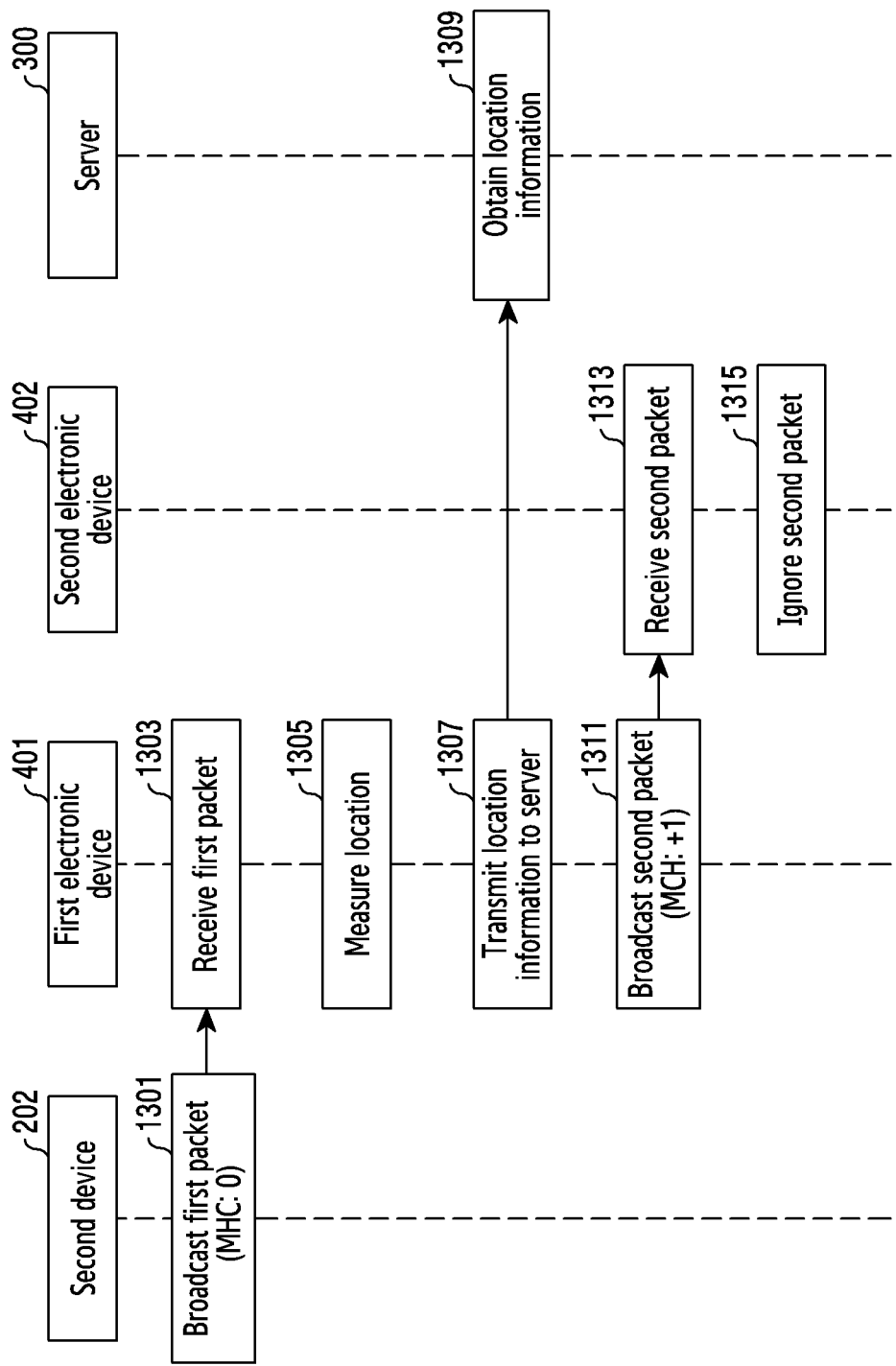
FIG. 13 is a flowchart illustrating reporting location information to a server and an adjacent device, based on a multi-hop count, according to various embodiments.

FIG. 13 is a flowchart illustrating reporting location information to a server and an adjacent device, based on a multi-hop count according to various embodiments.

Referring to FIG. 13, in operation 1301, a second device 202 may broadcast a first packet. The first packet may include a multi-hop count of a first value. For example, the first value may be configured to 0.

According to an embodiment, in operation 1303, a first electronic device 401 may receive the first packet. The first electronic device 401 may use a first wireless communication circuit supporting short-range communication, such as BLE communication, to receive the first packet. In an embodiment, the first electronic device 401 may identify that the multi-hop count of the first packet is 0, and may start location measurement. A case in which a multi-hop count of an advertising packet received by the first electronic device 401 is not 0 will be described with reference to FIG. 14.

According to an embodiment, in operation 1305, the first electronic device 401 may perform the location measurement. For example, the first electronic device 401 may obtain latitude/longitude coordinates of a point where the first electronic device 401 is located using a location measurement circuit (e.g., a GPS) (e.g., the communication module 190 of FIG. 1). When the location measurement circuit of the first electronic device 401 is in an inactive state, the first electronic device 401 may activate the location measurement circuit in response to receiving the first packet having the multi-hop count of 0. To obtain accurate coordinates, the location measurement may take several seconds to dozens of seconds.

According to an embodiment, after the location measurement is completed, the first electronic device 401 may transmit location information to a server 300 in operation 1307. The first electronic device 401 may use a second wireless communication circuit capable of long-distance communication, such as cellular communication or Wi-Fi communication, for communication with the server. The first electronic device 401 may also provide identification information about the second device 202 included in the first packet to the server 300. The server 300 may obtain the identification information about the second device 202 and location information about the first electronic device 401 from the first electronic device 401 in operation 1309.

According to an embodiment, in operation 1311, the first electronic device 401 may broadcast a second packet using the first wireless communication circuit. The second packet may include the identification information about the second device 202. For example, the second packet may include a multi-hop count greater than the multi-hop count of the first packet.

In an embodiment, operation 1311 may be performed when a response (e.g., an ACK message) indicating that a signal transmitted in operation 1307 has been normally received by the server 300 is received from the server 300.

According to an embodiment, in operation 1313, a second electronic device 402 may obtain the second packet broadcast by the first electronic device 401. From a viewpoint of the first electronic device 401, the second device 202 may be referred to as a first external device, and the second electronic device 402 may be referred to as a second external device.

According to an embodiment, in operation 1315, the second electronic device 402 may identify that the multi-hop count of the second packet is not the first value that is predefined, and may ignore the obtained second packet. Ignoring the second packet may, for example, mean simply deleting or dropping the second packet without performing location measurement even though the second packet is received. For example, the second electronic device 402 may not measure the location of the second electronic device 402. According to an embodiment, the second electronic device 402 may maintain a location measurement circuit of the second electronic device 402 in an inactive state, or may change the location measurement circuit of the second electronic device 402 to the inactive state.

Figure 14:
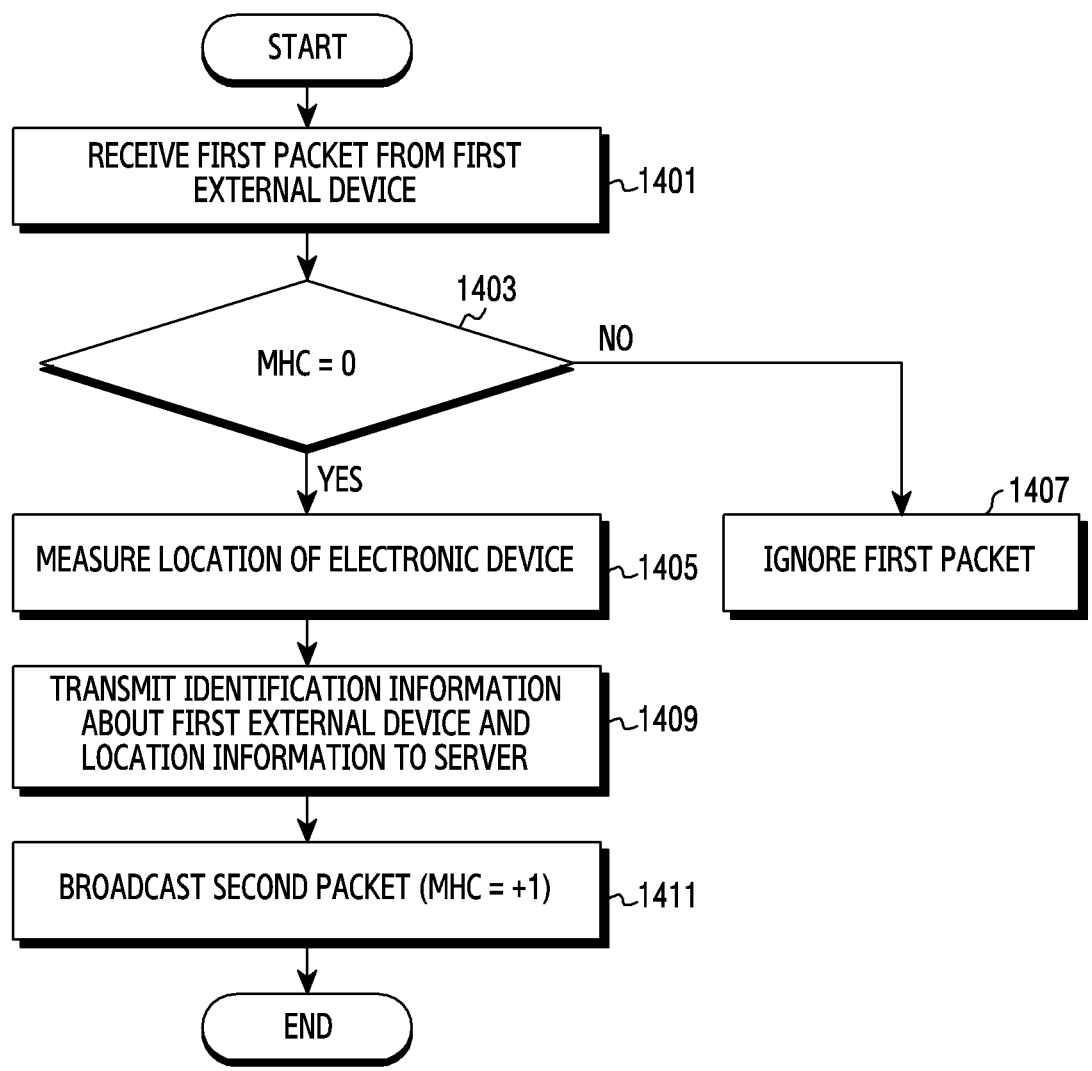
FIG. 14 is a flowchart illustrating an operation of an example electronic device when an advertising packet is received according to various embodiments.

FIG. 14 is a flowchart illustrating an operation of an example electronic device when an advertising packet is received according to various embodiments.

Referring to FIG. 14, in operation 1401, the electronic device 400 (e.g., the first electronic device 401) may receive a first packet from a first external device (e.g., the second device 202). For example, the first electronic device 401 may receive an advertising packet 1000 from the second device 202.

According to an embodiment, in operation 1403, the electronic device 400 (e.g., the first electronic device 401) may determine whether a multi-hop count included in the first packet is 0. When the multi-hop count is 0, the electronic device 400 (e.g., the first electronic device 401) may measure the location of the electronic device 400 (e.g., the first electronic device 401) using a GPS or the like in operation 1405. When the multi-hop count is not 0, the electronic device 400 (e.g., the first electronic device 401) may ignore the first packet in operation 1407. In an embodiment, the electronic device 400 may determine whether there is a history of already processing the first packet, and may ignore the first packet when there is the history of already processing the first packet. When there is no history of processing the first packet, the electronic device 400 may increase the multi-hop count, and may broadcast a packet (e.g., a second packet) having the increased multi-hop count to surrounding devices. For example, the electronic device 400 may perform multi-hop participation with respect to the same device (e.g., the second device 202) only once for a designated time (e.g., 10 minutes).

According to an embodiment, in operation 1409, the electronic device 400 (e.g., the first electronic device 401) may transmit identification information about the first external device (e.g., the second device 202) included in the first packet and location information about the electronic device 400 (e.g., the first electronic device 401) to a server 300. In operation 1411, the electronic device 400 (e.g., the first electronic device 401) may broadcast the second packet having a multi-hop count greater than that of the first packet so that a second external device (e.g., the second electronic device 402) obtains the second packet. Operation 1411 may be performed substantially simultaneously with operation 1409, or may be performed prior to operation 1409. However, in an embodiment, operation 1411 may be performed only after the electronic device 400 (e.g., the first electronic device 401) obtains a response message from the server 300 after operation 1409.

Figure 15:
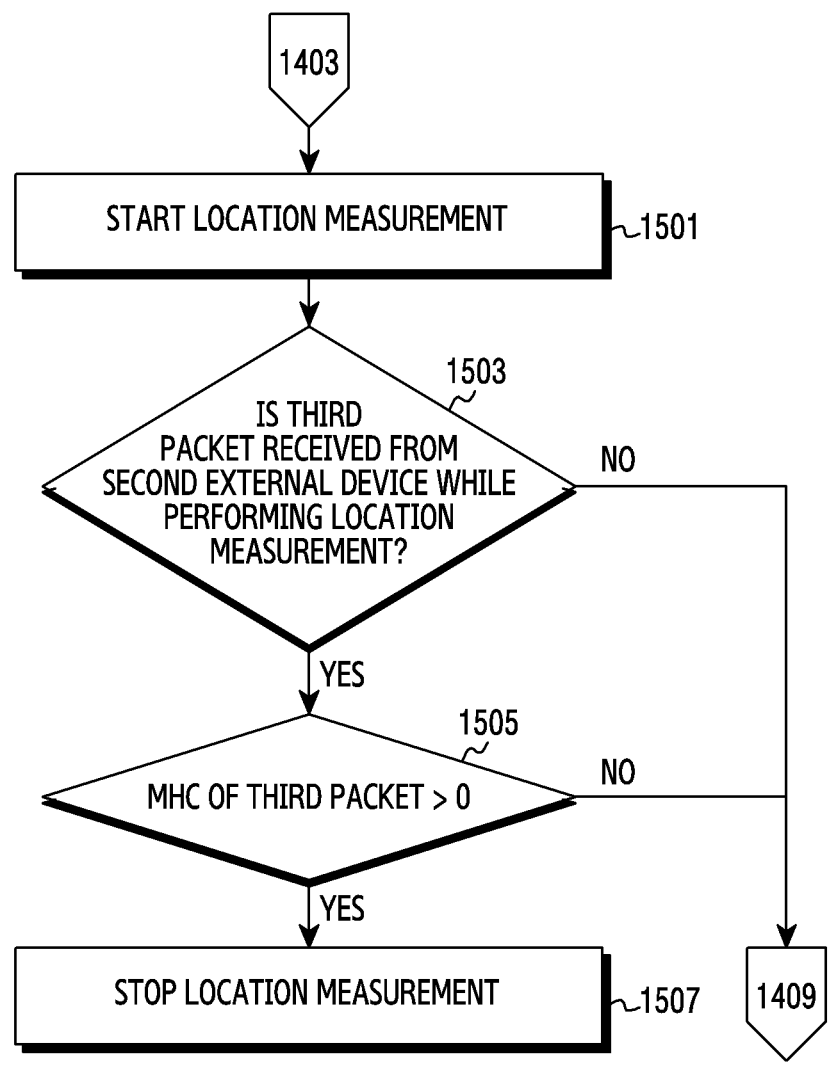
FIG. 15 is a flowchart illustrating an operation of an example electronic device when an additional advertising packet is received after location measurement according to various embodiments.

FIG. 15 is a flowchart illustrating an operation of an example electronic device when an additional advertising packet is received after location measurement according to various embodiments.

Referring to FIG. 14 and FIG. 15, when the multi-hop count of the first packet received from the first external device (e.g., the second device 202) is 0, the electronic device 400 (e.g., the first electronic device 401) may start measuring the location in operation 1501. For example, the electronic device 400 (e.g., the first electronic device 401) may activate a location measurement circuit, such as the GPS, and may start measuring the location of the electronic device 400 (e.g., the first electronic device 401).

According to an embodiment, in operation 1503, the electronic device 400 may determine whether a third packet is received from a second external device (e.g., the second electronic device 402) while measuring the location. When the third packet is not received, the electronic device 400 may perform operation 1409 and subsequent operations. For example, when not receiving an additional advertising packet while measuring the location, the electronic device 400 (e.g., the first electronic device 401) may report the location information to the server (e.g., the server 300), and may broadcast the second packet. According to an embodiment, a period in which the location is measured may refer, for example, to a time taken to activate the location measurement circuit and receive a GPS signal to identify the location of the electronic device 400 (e.g., the first electronic device 401).

In an embodiment, when receiving the third packet from the second external device (e.g., the second electronic device 402), the electronic device 400 (e.g., the first electronic device 401) may identify a multi-hop count of the third packet in operation 1505. For convenience of description, the third packet is assumed to also include the same identification information about the first external device (e.g., the second device 202). The electronic device 400 (e.g., the first electronic device 401) may stop or complete measuring the location, based on the multi-hop count included in the third packet. For example, when the multi-hop count of the third packet is greater than 0, for example, when the multi-hop count of the third packet has a value of 1 or 2, the electronic device 400 (e.g., the first electronic device 401) may determine that a different device has already reported location information to the server 300 with respect to the first external device (e.g., the second device 202). Accordingly, in operation 1507, the electronic device 400 may stop measuring the location. When the location has already completely measured, the electronic device 400 (e.g., the first electronic device 401) may not report completely measured location information to the server 300.

In an embodiment, when the multi-hop count of the third packet is 0, the electronic device 400 (e.g., the first electronic device 401) may determine that a second advertising packet is received from the first external device (e.g., the second device 202). Therefore, the electronic device 400 may determine that a report on the first external device (e.g., the second device 202) has not yet been performed by a different device, may complete measuring the location, and may then perform operation 1409 and operation 1411 described above.

An electronic device (e.g., the electronic device 101, the electronic device 400, the first electronic device 401, or the second electronic device 402) according to an embodiment disclosed herein may include a location measurement circuit, a first wireless communication circuit configured to support short-range communication, a second wireless communication circuit; and at least one processor (e.g., the processor 120) configured to be electrically connected to the location measurement circuit, the first wireless communication circuit, and the second wireless communication circuit, wherein the at least one processor may be configured to receive a first advertising packet 1000 including identification information 1004 about a first external device (e.g., the second device 202) and a multi-hop count 1003 from the first external device using the first wireless communication circuit, obtain location information about the electronic device using the location measurement circuit when the multi-hop count included in the first advertising packet is a first value, transmit a signal including the identification information about the first external device and the location information to a server 300 using the second wireless communication circuit, and broadcast a second advertising packet including the identification information about the first external device and a multi-hop count having a second value greater than the first value using the first wireless communication circuit.

In an embodiment, the first value of the multi-hop count may be 0.

In an embodiment, the short-range communication may be Bluetooth Low Energy (BLE).

In an embodiment, the second wireless communication circuit may support at least one of a cellular network or a Wi-Fi network.

In an embodiment, the at least one processor may be configured to broadcast the second advertising packet when receiving a response indicating that the signal is normally transmitted from the server.

In an embodiment, the at least one processor may be configured to ignore the first advertising packet when the multi-hop count included in the first advertising packet is not the first value.

In an embodiment, the at least one processor may be configured to obtain a third advertising packet including the identification information about the first external device from a second external device while measuring a location of the electronic device using the location measurement circuit, and may complete or stop measuring the location, based on a multi-hop count included in the third advertising packet. For example, the at least one processor may be configured to stop measuring the location when the multi-hop count included in the third advertising packet has a value greater than the first value.

In an embodiment, the location measurement circuit may be a GPS.

In an embodiment, the electronic device may further include a display, and the at least one processor may be configured to perform a scan using the first wireless communication circuit at a first interval when the display is on, and a scan using the first wireless communication circuit at a second interval longer than the first interval when the display is off.

An operating method of an electronic device according to an embodiment disclosed herein may include: receiving a first advertising packet from a first external device using a first wireless communication circuit of the electronic device, the first advertising packet including identification information about the first external device and a multi-hop count; obtaining location information about the electronic device using a location measurement circuit when the multi-hop count included in the first advertising packet is a first value, using at least one processor of the electronic device; transmitting a signal including the identification information about the first external device and the location information to a server using a second wireless communication circuit of the electronic device; and broadcasting a second advertising packet including the identification information about the first external device and a multi-hop count having a second value greater than the first value using the first wireless communication circuit.

In an embodiment, the broadcasting of the second advertising packet may be performed when receiving a response indicating that the signal is normally transmitted from the server.

In an embodiment, the method may further include ignoring the first advertising packet when the multi-hop count included in the first advertising packet is not the first value.

In an embodiment, the method may further include obtaining a third advertising packet including the identification information about the first external device from a second external device while measuring a location of the electronic device using the location measurement circuit and completing or stopping measuring the location, based on a multi-hop count included in the third advertising packet.

In an embodiment, when the multi-hop count included in the third advertising packet has a value greater than the first value, measuring the location may be stopped.

An electronic device (e.g., the second device 202) according to an embodiment disclosed herein may include a wireless communication circuit 1030, a memory 1020, and a processor 1010 configured to be electrically connected to the wireless communication circuit and the memory, wherein the processor may be configured to broadcast an advertising packet 1000 including identification information 1004 about the electronic device and a multi-hop count 1003 having a first value using the wireless communication circuit.

In an embodiment, the wireless communication circuit may broadcast the advertising packet using BLE communication.

In an embodiment, the first value of the multi-hop count may be 0.

In an embodiment, the advertising packet may further include information indicating whether the electronic device is a device operating alone or a device operating by pairing with a difference device.

In an embodiment, the electronic device may be one of earbuds, a Bluetooth headphone, a tablet PC, and a smartwatch.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium, where the term "non-transitory" simply refers, for example, to the storage medium being a tangible device, and does not include a signal (e.g., an electromagnetic wave), and this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a location measurement circuit;
   a first wireless communication circuit configured to support short-range communication;
   a second wireless communication circuit;
   at least one processor comprising processing circuitry; and
   memory storing instructions that, when executed by the at least one processor, cause the electronic device to:
   receive a first advertising packet from a first external device using the first wireless communication circuit, the first advertising packet comprising identification information of the first external device and a multi-hop count;
   obtain location information of the electronic device using the location measurement circuit in a case that the multi-hop count included in the first advertising packet is a first value;
   transmit a signal comprising the identification information of the first external device and the location information of the electronic device to a server using the second wireless communication circuit; and
   broadcast a second advertising packet comprising the identification information of the first external device and the multi-hop count having a second value greater than the first value using the first wireless communication circuit.

2. The electronic device of claim 1, wherein the first value of the multi-hop count is 0, and
   the first advertising packet is ignored in a case that the multi-hop count included in the first advertising packet is not the first value.

3. The electronic device of claim 1, wherein the first wireless communication circuit is configured to support Bluetooth Low Energy (BLE), and the second wireless communication circuit is configured to support at least one of a cellular network or a Wi-Fi network.

4. The electronic device of claim 1, wherein the instructions, when executed by the at least one processor, cause the electronic device to broadcast the second advertising packet in a case of receiving a response indicating that the signal is normally transmitted from the server.

5. The electronic device of claim 1, wherein the instructions, when executed by the at least one processor, cause the electronic device to obtain a third advertising packet comprising the identification information of the first external device from a second external device while measuring a location of the electronic device using the location measurement circuit, and complete or stop measuring the location, based on a multi-hop count included in the third advertising packet.

6. The electronic device of claim 5, wherein the instructions, when executed by the at least one processor, cause the electronic device to stop measuring the location in a case that the multi-hop count included in the third advertising packet has a value greater than the first value.

7. The electronic device of claim 1, further comprising a display,
wherein the instructions, when executed by the at least one processor, cause the electronic device to perform a scan using the first wireless communication circuit at a first interval in a case that the display is on, and perform a scan using the first wireless communication circuit at a second interval longer than the first interval in a case that the display is off.

8. An operation method of an electronic device, the operation method comprising:
receiving a first advertising packet from a first external device using a first wireless communication circuit of the electronic device, the first advertising packet comprising identification information of the first external device and a multi-hop count;
obtaining location information of the electronic device using a location measurement circuit of the electronic device in a case that the multi-hop count included in the first advertising packet is a first value, using at least one processor of the electronic device;
transmitting a signal comprising the identification information of the first external device and the location information of the electronic device to a server using a second wireless communication circuit of the electronic device; and
broadcasting a second advertising packet comprising the identification information of the first external device and the multi-hop count having a second value greater than the first value using the first wireless communication circuit.

9. The operation method of claim 8, wherein the broadcasting of the second advertising packet is performed in a case of receiving a response indicating that the signal is normally transmitted from the server.

10. The operation method of claim 8, further comprising ignoring the first advertising packet in a case that the multi-hop count included in the first advertising packet is not the first value.

11. The operation method of claim 8, further comprising:
obtaining a third advertising packet comprising the identification information of the first external device from a second external device while measuring a location of the electronic device using the location measurement circuit; and
stopping measuring the location in a case that the multi-hop count included in the third advertising packet has a value greater than the first value.

12. An electronic device comprising:
a wireless communication circuit;
memory; and
at least one processor, comprising processing circuitry, configured to be electrically connected to the wireless communication circuit and the memory,
wherein the at least one processor is configured to broadcast a first advertising packet comprising identification information of the electronic device and a multi-hop count having a first value indicating that location information for the electronic device has not been reported to a server, using the wireless communication circuit.

13. The electronic device of claim 12, wherein the wireless communication circuit is configured to broadcast the first advertising packet using BLE communication.

14. The electronic device of claim 12, wherein the first value of the multi-hop count is 0.

15. The electronic device of claim 12, wherein the first advertising packet further comprises information indicating whether the electronic device is a device operating alone or a device operating by pairing with a difference device.

* * * * *